United States Patent
Lhost et al.

(10) Patent No.: US 11,856,662 B2
(45) Date of Patent: Dec. 26, 2023

(54) USE OF COMPOSITE MATERIALS IN THE MANUFACTURE OF ELECTRICAL HEATING PANELS, PROCESS OF PRODUCTION AND ELECTRICAL HEATING PANELS THEREOF

(71) Applicant: TOTALENERGIES ONETECH, Courbevoie (FR)

(72) Inventors: Olivier Lhost, Havre (BE); Yves Trolez, Arquennes (BE); Cristo Boukalidis, Sirault (BE); François Marcq, Seneffe (BE)

(73) Assignee: TOTALENERGIES ONETECH, Courbevoie (FR)

( * ) Notice: Subject to any disclaimer, the term of this patent is extended or adjusted under 35 U.S.C. 154(b) by 0 days.

(21) Appl. No.: 17/908,867

(22) PCT Filed: Feb. 24, 2021

(86) PCT No.: PCT/EP2021/054606
§ 371 (c)(1),
(2) Date: Sep. 1, 2022

(87) PCT Pub. No.: WO2021/175684
PCT Pub. Date: Sep. 10, 2021

(65) Prior Publication Data
US 2023/0092288 A1    Mar. 23, 2023

(30) Foreign Application Priority Data

Mar. 2, 2020 (EP) .................................. 20160415

(51) Int. Cl.
*H05B 3/36* (2006.01)
*B32B 27/08* (2006.01)
(Continued)

(52) U.S. Cl.
CPC ............... *H05B 3/36* (2013.01); *B32B 27/08* (2013.01); *B32B 27/20* (2013.01); *B32B 27/32* (2013.01);
(Continued)

(58) Field of Classification Search
CPC . H05B 3/36; H05B 3/145; H05B 3/34; H05B 2203/014; H05B 2214/04;
(Continued)

(56) References Cited

U.S. PATENT DOCUMENTS 7,977,608 B2    7/2011   Diemer et al.
2010/0240832 A1  9/2010   Duc et al.
(Continued)

FOREIGN PATENT DOCUMENTS

CN      114175385 A  *  3/2022  ............. C08L 23/06
EA       012734      * 12/2009
(Continued)

OTHER PUBLICATIONS

Jiang, et al., "Light-Weight, Flexible, Low-Voltage Electro-Thermal Film Using Graphite Nanoplatelets for Wearable/Smart Electronics and Deicing Devices", Journal of alloys and compounds 699, 2017, pp. 1049-1056.
(Continued)

*Primary Examiner* — Shawntina T Fuqua
(74) *Attorney, Agent, or Firm* — Ewing & Jones, PLLC

(57) ABSTRACT

The disclosure relates to the use of a composite material as electro-thermal material in a process for the production of an electrical heating panel, wherein the electrical heating panel comprises at least one device selected from a plate, a sheet or a film, wherein said device has one or more layers wherein at least one layer is a heating layer made of a composite material comprising a first polymer which is one or more amorphous polymers or one or more semi-crystal-
(Continued)

line polymers selected from polyethylene and/or polypropylene; and from 2.0 to 20.0 wt. % of carbon particles and wherein the heating layer or at least one heating layer has a thickness ranging from 100 μm to 4.0 mm. The disclosure also relates to the use of such electrical heating panel in a motor vehicle.

28 Claims, 3 Drawing Sheets

(51) Int. Cl.
    *B32B 27/20*     (2006.01)
    *B32B 27/32*     (2006.01)
    *H05B 3/14*     (2006.01)

(52) U.S. Cl.
    CPC ........ *H05B 3/145* (2013.01); *B32B 2264/108* (2013.01); *B32B 2270/00* (2013.01); *B32B 2272/00* (2013.01); *B32B 2307/304* (2013.01); *B32B 2307/72* (2013.01); *B32B 2307/732* (2013.01); *B32B 2457/00* (2013.01); *B32B 2607/00* (2013.01); *H05B 2203/017* (2013.01); *H05B 2214/04* (2013.01)

(58) Field of Classification Search
    CPC ......... B32B 27/08; B32B 27/20; B32B 27/32; B32B 2264/108; B32B 2270/00; B32B 2272/00; B32B 2307/304; B32B 2307/72; B32B 2307/732; B32B 2457/00; B32B 2607/00
    See application file for complete search history.

(56) References Cited

U.S. PATENT DOCUMENTS

| | | | |
|---|---|---|---|
| 2012/0289656 A1 | 11/2012 | Knoeppel et al. | |
| 2018/0297340 A1* | 10/2018 | Lima | B29C 63/06 |
| 2019/0237224 A1* | 8/2019 | Heinemann | H01C 7/027 |

FOREIGN PATENT DOCUMENTS

| | | | | |
|---|---|---|---|---|
| EA | 012734 B1 | * | 12/2009 | |
| EP | 2401311 A1 | | 1/2012 | |
| EP | 3479651 A1 | * | 5/2019 | H01C 7/027 |
| EP | 3479651 B1 | | 4/2020 | |
| WO | 2016126827 A1 | | 8/2016 | |
| WO | WO-2016126827 A1 | * | 8/2016 | C01B 32/158 |
| WO | WO-2023056541 A1 | * | 4/2023 | |

OTHER PUBLICATIONS

Khan, et al., "Self-Powered Transparent Flexible Graphene Microheaters", Nano Energy 17, 2015, 34 pages.
Li, et al., "Positive Temperature Coefficient Characteristic and Structure of Graphite Nanofibers Reinforced High-Density Polyethylene/Carbon Black Nanocomposites" Composites: Part B 40, 2009, pp. 218-224.
Zeng et. al., "Positive temperature coefficient thermistors based on carbon nanotube/polymer composites"; Scientific Reports, 2014. vol. 4, Issue 1, 2014, 7 pages.
Nakano, et al., "Resistivity—Temperature Characteristics of Filler-Dispersed Polymer Composites", Polymer 53, pp. 6112-6117 (2012).
Shchegolkov et al., "Electric Heaters Based on Nanomodified Paraffin with Self-Installing Heat Contact for Anti-Icing Systems of Aerospace Crafts"; Eastern-European Journal of Enterprise Technologies, pp. 28-34 (2018).
Chu et al., "Electrical Heating Behavior of Flexible Carbon Nanotube Composites with Different Aspect Ratios", Journal of Industrial and Engineering Chemistry 35, pp. 195-198 (2016).
Malinovskaya et.al, "Multifunctional Composite Material Based on Carbon-Filled Polyurethane", IOP Conf. Ser.: Mater. Sci. Eng. 93 012038 (2015), 7 pages.
Zheming, et. al., "Electrical Properties and Morphology of Highly Conductive Composites Based on Polypropylene and Hybrid Fillers"; Journal of Industrial and Engineering Chemistry, 16, pp. 10-14 (2010).
G.J. Ray et al., "Carbon-13 Nuclear Magnetic Resonance Determination of Monomer Composition and Sequence Distribution in Ethylene-Propylene Copolymers Prepared with a Stereoregular Catalyst System"; Macromolecules, vol. 10, n° 4, 1977, p. 773-778.
Razavi et al., The Geometry of the Site and its Relevance for Chain Migration and Stereospecificity, Macromol. Symp., vol. 89, pp. 345-367, 1995.
International Search Report and Written Opinion issued in Application No. PCT/EP2021/054606, dated May 31, 2021, 15 pages.
International Preliminary Report on Patentability issued in Application No. PCT/EP2021/054606, dated Jun. 10, 2022, 7 pages.

* cited by examiner

USE OF COMPOSITE MATERIALS IN THE MANUFACTURE OF ELECTRICAL HEATING PANELS, PROCESS OF PRODUCTION AND ELECTRICAL HEATING PANELS THEREOF

CROSS-REFERENCE TO RELATED APPLICATIONS

This application claims the benefit of PCT/EP2021/054606 filed Feb. 24, 2021, which claims priority from EP 20160415.4 filed Mar. 2, 2020, which are incorporated herein by reference in their entireties for all purposes.

The invention relates to the use of composite materials in the manufacture of electrical heating panels, to the process of production of the electrical heating panels and to the electrical heating panels thereof.

Electrical heating panels are known and described for example, in U.S. Pat. No. 7,977,608. This document describes a panel heating system including a support and a heating layer, which contains electrically conductive plastic, with the heating layer configured from a flexible film and the support is flexible. The method for producing the heating system is also described, in which a heating layer containing electrically conductive plastic is joined to a support. The heating layer is formed by the application of an electrically conductive, in particular, expandable or expanded, plastic material to the support, and the subsequent curing of the plastic material on the support.

In "*Light-Weight, Flexible, Low-Voltage Electro-Thermal Film Using Graphite Nanoplatelets for Wearable/Smart Electronics and Deicing Devices*", H. Jiang, et al., Journal of alloys and compounds 699, 1049 (2017), graphite nanoplatelets (GNP) enclosed in multilayer structures containing cupper foils acting as electrodes and polyethylene terephthalate (PET) and/or ethylene vinyl acetate copolymer (EVA) layers are reported as presenting an interest as light-weight, flexible, low-voltage electro-thermal film for wearable/smart electronics and deicing devices. The GNP electro-thermal (EGNP) films can work at a high heating rate of 25 to 65° C./min and a high cooling rate of 24 to 32° C./min under a low voltage of 3 to 5 V, due to the low electrical resistivity (8.9 mU cm), low sheet resistance (1.51 U sq$^{-1}$) and high in-plane thermal conductivity (~50 W (m K)$^{-1}$) of GNP films. The high electrical and thermal conductance of GNP films was attributed to the orientation of GNPs in microstructure, which could be controlled by the gap coating process, the solid content of GNP dispersions and the quality of GNPs fabricated by ultrasonic exfoliation.

In "*Self-Powered Transparent Flexible Graphene Microheaters*", U. Khan, et al., Nano Energy 17, 356 (2015) proposed a transparent and flexible graphene microheater deposited on a polyethylene naphthalate (PEN) substrate and protected by a hexagonal boron nitride (h-BN) layer. The top h-BN passivation enhances the microheater temperature by almost 80% due to the protection from the environment. The microheaters exhibit high efficiency, with power consumption and heating time response of around 40 mW and 4 sec, respectively, for achieving temperatures above 200° C. in a circular active region with a diameter of 146 µm. Due to an optimized micro-patterning of the graphene-based heater, the devices exhibit a very uniform temperature distribution, with maximum temperature differences within the active region around 15° C. and without hot-spots. Bending tests have demonstrated that the microheater is flexible. Moreover, due to the superior sheet resistance of CVD-graphene, in striking contrast with conventional (i.e., metallic) microheaters, our devices can be effectively powered by energy harvesters such as triboelectric nanogenerators; as a proof-of-concept, a temperature increase of 8° C. has been achieved by powering the microheater with a sound driven textile-based triboelectric nanogenerator.

These devices appear to be efficient, but their process of fabrication is complicated. There is a need for simple processes to produce efficient heating panels.

Conducting polymer composites comprising polyolefins have also been studied. In "*Positive Temperature Coefficient Characteristic and Structure of Graphite Nanofibers Reinforced High-Density Polyethylene/Carbon Black Nanocomposites*" Q. Li, et al., Composites: Part B 40, 218 (2009), graphite nanofibers (GNF) and carbon black (CB) filled high density polyethylene (HDPE) hybrid composites were fabricated using a melt mixing method. The effects of the CB and GNF content on the room temperature resistivity and positive temperature coefficient (PTC) behaviour of the nanocomposites were examined. The room temperature resistivity of the composites decreased significantly with increasing GNF content, but this was not always the case with the PTC intensity. The incorporation of a small amount of GNF into the HDPE/CB composites significantly improved the PTC intensity and reproducibility of the hybrid nanocomposites. The maximum PTC effect, whose log intensity was approximately 7.2, was observed in the HDPE/CB/GNF (80/20/0.25 wt %) nanocomposite with relatively low room temperature resistivity. However, the PTC properties were observed close to the melting temperature, there is a need to achieve a PTC effect at a given temperature or range of temperature that can be well below the melting temperature.

In Y. Zeng, et. al, Scientific Reports. 2014. Vol. 4, Issue 1 (2014), high-density polyethylene, filled with CNT or carbon black also exhibit a PTC behaviour, was reported for thermistors applications. The CNT-based thermistors exhibit much larger hold current and higher hold voltage, increasing by 129% in comparison with the commercial carbon black (CB) filled HDPE thermistors. It was found that because of their high current-bearing capacity and quick response, the CNT-based thermistors have great potential to be used as high-performance thermistors in practical application, especially in some critical circumstances of high temperature, large applied currents, and high applied voltages.

In "*Resistivity-Temperature Characteristics of Filler-Dispersed Polymer Composites*", H. Nakano, et al., Polymer 53, 6112 (2012) the authors have described composites containing carbon nanotube (CNT) or carbon black (CB) conductive particle filler that have the special characteristics of positive-temperature-coefficient (PTC) effects of resistivity. The relationship between poly(vinylidene fluoride) (PVDF) polymer's thermal volume expansion and the PTC effects of PVDF/CNT and PVDF/CB Was studied. The equation to revise filler content at each temperature due to the considerable thermal volume expansion rate of PVDF polymer indicates that filler content decrease with rising temperature. The graphs of filler content at room temperature plotted against apparent filler content with PTC effect were linear and their slopes were constant. From these graphs, it can be determined the filler content necessary to occurring PTC effects. For example, the CNT content was 89% at room temperature, and the CB content was 93%.

In "*Electric Heaters Based on Nanomodified Paraffin with Self-Installing Heat Contact for Anti-Icing Systems of Aerospace Crafts*". A. Shchegolkov, et al., Eastern-European Journal of Enterprise Technologies, 28 (2018), a functional material which radiates heat upon passage of electric current was prepared by employing nanomodification of paraffin with carbon nanotubes. Upon installation of electrodes onto functional material and dielectric insulation, a heater is formed. The heater based on nanomodified paraffin showed self-regulating properties owing to the phase transition. The value of the specific surface area to power ranges from 300 w/m$^2$ to 3 kW/m$^2$. It was discovered that for the electric heater based on nanomodified paraffin under directed current, specific power is 800±10% W/m$^2$ at an ambient temperature of +10° C. When the temperature is decreased to −40° C., specific heating power increases to 1,600±20% W/m$^2$. It was discovered, that the effect of self-installing heat contact is manifested when the matrix capable of phase transition is used. Improvement of heat contact occurs within 20 seconds due to thermal expansion at a phase transition in nanomodified paraffin. This allows for improved heat transfer and efficiency of heaters used for large areas.

In "*Electrical Heating Behavior of Flexible Carbon Nanotube Composites with Different Aspect Ratios*", K. Chu et al., Journal of Industrial and Engineering Chemistry 35, 195 (2016), the authors found that in carbon nanotube (CNT) polymer composites, the small thermal capacitance of the polymer and high thermal conductivity of the CNTs enable rapid heating. Highly conducting polydimethylsiloxane (PDMS) nanotube composites with different aspect ratios of CNT were investigated to observe their electrical heating behavior. The electrical conductivity of the CNT/PDMS composite with higher ratio CNTs showed the conductivity up to two orders of magnitudes larger than the composites with lower aspect ratio CNTs. Moreover, the degree of negative temperature coefficient of resistance originating from the interconnection resistance between the CNTs could be dramatically increased by using higher aspect ratio CNTs.

In "Multifunctional Composite Material Based on Carbon-Filled Polyurethane", T. Malinovskaya, et. al, 10P Conf. Ser.: Mater. Sci. Eng. 93 012038 (2015) have deal with the performance of composite resistive material heating coatings based on the polyurethane binder, filled with colloidal-graphite preparation C1, which can be used in structures of electric heaters. Frequency dependences of transmission and reflection coefficients, dielectric permeability of composite materials with the various content of carbon fillers (technical carbon, graphite) in polyurethane varnish in ranges of frequencies 26-40 GHz and 110-260 GHz are experimentally investigated.

In "*Electrical Properties and Morphology of Highly Conductive Composites Based on Polypropylene and Hybrid Fillers*" G. Zheming, et. al, Journal of Industrial and Engineering Chemistry 16,10 (2010), electrically conductive polypropylene/hybrid filler (PP/GO—MWNTs) and PP/MWNTs composite have been prepared via melt blending PP with the hybrid filler (multiwalled carbon nanotubes (MWNTs) and graphite oxide (GO)) and the single filler (MWNTs), respectively. Scanning electron microscopy (SEM) and transmission electron microscopy (TEM) were used to research the interior morphology of the GO—MWNTs hybrid filler, and the dispersion of the hybrid filler in the PP matrix is also observed by SEM. The results show that a clear reduction in electrical resistivity and percolation threshold of PP/GO—MWNTs composite can be ascribed to the corporation of GO. The electrical properties of PP composites were improved owing to the effective conductive networks formed by hybrid filler.

There is a need for a process to produce electrical heating panels that could rapidly heat when a potential difference is applied and be such that overheating is avoided. There is a need for a process to produce electrical heating panels that is simple and cheap, and wherein the electrical heating panels produced show an improved balance of properties between heating speed and stationary temperature achieved; with preference, between heating speed, stationary temperature and heating power. There is a need for a process to produce electrical heating panels wherein the stationary temperature is controlled to stay below a targeted temperature (and thus avoiding overheating) even in the absence of temperature-regulating device that is external to the heating layer of the electrical heating panel. There is a need for a process to produce electrical heating panels allowing the incorporation of recycled material wherein said electrical heating panels can be placed in the passenger compartment of a motor vehicle without causing discomfort of the passengers. There is a need for a process to produce electrical heating panels that is cheap and simple wherein the electrical heating panels is suitable for use in de-icing devices. There is also a need to produce efficient electrical heating panels with a cost-efficient process wherein the heating panels shows an improved balance of electrical and mechanical properties.

The disclosure aims to provide a solution to one or more for the above-listed need or to at least improve the situation.

According to a first aspect, the disclosure provides the use of a composite material as electro-thermal material in a process for the production of an electrical heating panel, wherein the electrical heating panel comprises at least one device selected from a plate, a sheet or a film, wherein said device has one or more layers wherein at least one layer is a heating layer, remarkable in that the one or more heating layers are made of a composite material comprising:

a first polymer which is one or more amorphous polymers or one or more semi-crystalline polymers selected from polyethylene and/or polypropylene;

from 2.0 to 20.0 wt. % of carbon particles based on the total weight of the composite material as determined according to ISO 11358:2014; wherein the carbon particles are selected from carbon nanotubes, carbon fibers, carbon black and any combination thereof; wherein at least 75 wt. % of the carbon particles based on the total weight of the carbon particles have an average aspect ratio L/D ranging from 10 to 800;

wherein each of the one or more heating layer has a thickness ranging from 100 μm to 4.0 mm.

Surprisingly, it has been discovered that it was possible to produce efficient electrical heating panels with a cost-efficient process by the use of composite material comprising suitable polymers and carbon particles. The use includes a proper selection of the polymer, the content and average aspect ratio L/D of the carbon particles, and the size of the device comprising heating layer formed by said composite material. The selection of the different parameters is made by keeping in mind a determined voltage to be applied and allows obtaining an improved compromise between costs production, heating power and heating speed achieved and heating temperature shown by the electrical heating panels. Also, the heating panels produced according to the disclosed use show an improved balance of electrical and mechanical properties. As it will be seen in detail, the use according to the disclosure allows the incorporation of post-consumer polymer resin within the electrical heating panels and therefore complies with the continuous effort to be provided to overcome the current ecological challenges.

In one or more embodiments, the use according to the first aspect comprises the production of the plate by compression moulding, or by injection moulding; with preference, by injection moulding. In one or more embodiments, the use according to the first aspect comprises the production of the sheet by extrusion. In one or more embodiments, the use according to the first aspect comprises the production of a cast film or a blown film.

For example, the use comprises the device being a sheet and the production of the sheet by extrusion or the use comprises the device being a plate and the production of the plate by injection moulding.

According to a second aspect, the disclosure provides the use of an electrical heating panel in a motor vehicle, wherein the electrical heating panel comprises at least device selected from a plate, a sheet or a film, wherein said device has one or more layers wherein at least one layer is a heating layer, and wherein the use comprises applying an electrical voltage ranging from 12 to 48 V to said electrical heating panel; the use being remarkable in that the one or more heating layers are made of a composite material comprising:
 a first polymer which is one or more amorphous polymers or one or more semi-crystalline polymers selected from polyethylene and/or polypropylene;
 from 2.0 to 20.0 wt. % of carbon particles based on the total weight of the composite material as determined according to ISO 11358:2014; wherein the carbon particles are selected from carbon nanotubes, carbon fibers, carbon black and any combination thereof; wherein at least 75 wt. % of the carbon particles based on the total weight of the carbon particles have an average aspect ratio L/D that is ranging from 10 to 800; wherein each of the one or more heating layers has a thickness ranging from 100 µm to 4.0 mm.

With preference, the use according to the second aspect is in the passenger compartment of a motor vehicle.

With preference, the electrical heating panel is produced by a process involving the use according to the first aspect.

For example, the use comprises applying an electrical voltage of 12 V or of 48 V to said electrical heating panel.

According to a third aspect, the disclosure provides an electrical heating panel produced by a process involving the use according to the first aspect.

According to a fourth aspect, the disclosure provides the use of an electrical heating panel produced by a process involving the use according to the first aspect in a de-icing device; for example, in an airplane.

According to a fifth aspect, the disclosure provides for an electrical heating panel, wherein the electrical heating panel comprises at least one device selected from a plate, a sheet or a film, wherein said device has one or more layers wherein at least one layer is a heating layer, remarkable in that the one or more heating layers are made of a composite material comprising:
 a first polymer which is one or more amorphous polymers or one or more semi-crystalline polymers selected from polyethylene and/or polypropylene;
 from 2.0 to 20.0 wt. % of carbon particles based on the total weight of the composite material as determined according to ISO 11358:2014; wherein the carbon particles are selected from carbon nanotubes, carbon fibers, carbon black and any combination thereof; wherein at least 75 wt. % of the carbon particles based on the total weight of the carbon particles have an average aspect ratio L/D that is ranging from 10 to 800; wherein each of the one or more heating layers has a thickness ranging from 100 µm to 4.0 mm.

In an embodiment, the device is a sheet; with preference the sheet is an extruded sheet. Alternatively, the device is a plate, with preference, the plate is an injection moulded plate.

In an embodiment, the device comprises one heating layer.

In an embodiment, the device is monolayered and comprises only the heating layer. In another embodiment, the device is multi-layered and comprises one or more heating layers and one or more insulating layer wherein the insulating layer is made of a third polymer that is the same than the first polymer or that is different from the first polymer provided it is of the same nature; with preference, the device is bi-layered and comprises one heating layer and one insulating layer or is tri-layered and comprises one insulating layer sandwiched between two insulating layers.

For example, the device is multi-layered and comprises one or more heating layer and one or more insulating layer, wherein the insulating layer is devoid of conductive particles; with preference the conductive particles are selected from one or more of carbon particles, carbon-coated particles, metal particles, metal oxide particles, alloy particles, metal-coated glass particles, metal-coated polymer particles, conductive polymer-coated particles and graphene nano-platelets (GNPs). For example, the insulating layer is devoid of conductive particles being metal particles wherein the metal may be selected from, for example, copper, silver, nickel, aluminium, titanium, zinc and/or gold. The insulating layer is devoid of conductive particles being one or more of silver particles (e.g. silver flakes) and/or silver-coated glass particles.

According to a sixth aspect, the disclosure provides for a motor vehicle remarkable in that it comprises one or more electrical heating panels according to the fifth aspect or involving the use according to the first aspect.

For example, the motor vehicle comprises a passenger compartment and the one or more electrical heating panel are within the passenger compartment.

For example, the motor vehicle is an airplane and the one or more electrical heating panels are a part of a de-icing device.

According to a seventh aspect, the disclosure provides for a de-icing device remarkable in that it comprises one or more electrical heating panels according to the fifth aspect.

According to an eighth aspect, the disclosure provides for a process for the production of an electrical heating panel according to the fifth aspect, wherein the electrical heating panel comprises at least one device selected from a plate, a sheet or a film; wherein said device has one or more layers wherein at least one layer is a heating layer; the process is remarkable in that comprises a step of providing a composite material comprising:
 a first polymer which is one or more amorphous polymers or one or more semi-crystalline polymers selected from polyethylene and/or polypropylene;
 from 2.0 to 20.0 wt. % of carbon particles based on the total weight of the composite material as determined according to ISO 11358:2014; wherein the carbon particles are selected from carbon nanotubes, carbon fibers, carbon black and any combination thereof; wherein at least 75 wt. % of the carbon particles based on the total weight of the carbon particles have an average aspect ratio L/D that is ranging from 10 to 800;
 and a step of producing at least one device, wherein one or more heating layers are made from the composite material and wherein each of the one or more heating layers has a thickness ranging from 100 µm to 4.0 mm.

For example, the process according to the eighth aspect involves the ue according to the first aspect.

In one or more embodiments of any one of the first to the eighth aspect, the carbon particles are selected from carbon nanotubes, carbon fibers and any combination thereof; and the carbon particles are devoid of carbon black. Alternatively, the carbon particles are a blend of carbon black with one or more selected from carbon nanotubes, carbon fibers and any combination thereof; provided the content of carbon black is at most 25 wt. % based on the total weight of the carbon particles.

In one or more embodiments of any one of the first to the eighth aspect, the device is monolayered and comprises only the heating layer. Alternatively, the device is multi-layered and comprises at least one heating layer and at least one insulating layer wherein the insulating layer is made of a third polymer that is the same than the first polymer or that is different from the first polymer provided it is of the same nature; with preference, the device is bi-layered and comprises one heating layer and one insulating layer or is tri-layered and comprises one insulating layer sandwiched between two insulating layers.

In one or more embodiments of any one of the first to the eighth aspect, the device comprises one heating layer. In such embodiment, the device can be monolayered or the device can be multi-layered and comprises a single heating layer and at least one insulating layer wherein the insulating layer is made of a third polymer that is the same than the first polymer or that is different from the first polymer provided it is of the same nature.

It is preferred that the insulating layer is devoid of conductive particles; with preference the conductive particles are selected from one or more of carbon particles, carbon-coated particles, metal particles, metal oxide particles, alloy particles, metal-coated glass particles, metal-coated polymer particles, conductive polymer-coated particles and graphene nanoplatelets (GNPs). For example, the insulating layer is devoid of conductive particles being metal particles wherein the metal may be selected from, for example, copper, silver, nickel, aluminium, titanium, zinc and/or gold. The insulating layer is devoid of conductive particles being one or more of silver particles (e.g. silver flakes) and/or silver-coated glass particles.

In one or more embodiments of any one of the first to the eighth aspect, the heating layer or at least one heating layer has a thickness ranging from 250 µm to 3.5 mm; preferably from 300 µm to 3.0 mm; more preferably ranging from 0.5 to 2.5 mm; even more preferably ranging from 1.0 to 2.0 mm or from 100 µm to 1.0 mm; or from 100 µm to 0.5 mm.

In one or more embodiments of any one of the first to the eighth aspect, the electrical heating panel is an assembly comprising at least one additional plate and/or at least one additional sheet and/or at least one additional film, different from the device. For example, the electrical heating panel is an assembly comprising at least one additional sheet made of a metallic material and/or one additional film of a polymeric material forming an insulating layer.

In any one of the first to the eighth aspect, one or more of the following can be used to further define the carbon particles and the composite material:

The carbon particles are carbon nanotubes or comprise carbon nanotubes.

The carbon particles are carbon nanotubes or comprise at least 65 wt. % of carbon nanotubes based on the total weight of the carbon particles; preferably at least 85 wt. % of carbon nanotubes.

The content of carbon particles is ranging from 4.0 to 18.0 wt. % of carbon particles based on the total weight of the composite material as determined according to ISO 11358:2014, for example, from 5.0 to 16.0 wt. % based on the total weight of the composite material; preferably, from 6.0 to 15.0 wt. % or from 6.5 to 14.0 wt. %; more preferably from 7.0 to 13.0 wt. %; even more preferably from 7.5 to 12.0 wt. %, and most preferably from 8.0 to 11.0 wt. %.

In one or more embodiments of any one of the first to the eighth aspect, the electrical heating panel further comprises two electrodes in contact with the heating layer, and the content of carbon particles in the composite material is selected to comply with the formula:

$$wt.\% \text{ carbon particles} \geq -\frac{1}{a} * \ln\left[\frac{U^2 * h}{b * HP_{min} * l^2}\right]$$

wherein:
U is the voltage intended to be applied to the electrical heating panel; preferably U is ranging from 12 to 48 V;
$HP_{min}$ is the minimal heating power desired; preferably $HP_{min}$ is ranging from 200 W/m² to 4000 W/m²; more preferably ranging from 500 W/m² to 3500 W/m²; even more preferably ranging from 1000 W/m² to 3000 W/m², and most preferably ranging from 1200 W/m² to 2500 W/m²;
h is the thickness of the heating layer and is ranging from 100 µm to 4.0 mm; preferably h is ranging from 250 µm to 3.5 mm; preferably from 300 µm to 3.0 mm; more preferably ranging from 0.5 to 2.5 mm; even more preferably ranging from 1.0 to 2.0 mm or from 100 µm to 1.0 mm or from 100 µm to 0.5 mm;
l is the distance between the two electrodes; preferably l is ranging from 5 to 50 cm; more preferably ranging from 6 to 40 cm;
a is at least 0.5, preferably a is ranging from 0.5 to 1.2
b is at least 2, preferably b is ranging from 2 to 800;
and wherein at least 75 wt. % of the carbon particles based on the total weight of the carbon particles have an average aspect ratio L/D ranging from 100 to 290 or from 140 to 290.

In one or more embodiments of any one of the first to the eighth aspect, the first polymer is present in the composite material at a content ranging from 5 to 98 wt. % based on the total weight of the composite material; for example, from 10 to 96 wt. %; for example, from 20 to 95 wt. %; for example, from 30 to 94 wt. %; for example, from 40 to 93 wt. %.

In one or more embodiments of any one of the first to the eighth aspect, the first polymer is selected from a virgin polymer resin, a post-consumer polymer resin and a blend of a virgin polymer resin and a post-consumer polymer resin.

In one or more embodiments of any one of the first to the eighth aspect, the first polymer comprises from 5 to 100 wt. % of post-consumer polymer resin based on the total weight of the first polymer; for example, from 20 to 95 wt. %; for example, from 40 to 90 wt. %, for example, from 50 to 85 wt. %; for example, from 60 to 80 wt. %.

In one or more embodiments of any one of the first to the eighth aspect, the composite material comprises from 0 to 50.0 wt. % of one or more fillers based on the total weight of the composite material; preferably from 0.1 to 50.0 wt. %, more preferably from 0.2 wt. % to 40.0 wt. %, even more preferably from 0.5 wt. % to 30.0 wt. %, most preferably from 1.0 wt. % to 20 wt. %, even most preferably from 1.5 wt. % to 15.0 wt. %, or from 2.5 wt. % to 12.5 wt. %, or from 5.0 wt. % to 10.0 wt. %, or from 5.0 wt. % to 15 wt. % or from 7.0 wt. % to 15 wt. %.

With preference, the one or more fillers are one or more reinforcement materials selected from talc mineral filler, wollastonite, calcium carbonate, modified calcium carbonate, coated calcium carbonate, glass fibres, bamboo fibres, flax fibres, hemp fibres, and any mixture thereof.

In one or more embodiments of any one of the first to the eighth aspect, the carbon particles are directly blended with the first polymer. Therefore, no masterbatch is used.

Alternatively, the carbon particles are provided in a form of a masterbatch comprising the blend of carbon particles in a content ranging from 4.0 wt. % to 30.0 wt. % as determined according to ISO 11358:2014 and based on the total weight of said masterbatch; and a second polymer which is one or more semi-crystalline polymers selected from polyethylene and/or polypropylene, or one or more amorphous polymers; provided that the second polymer is of the same nature than the first polymer.

For example, the second polymer is present in the composite material at a content ranging from 5 to 90 wt. % based on the total weight of the composite material, for example, from 10 to 80 wt. %; for example, from 15 to 70 wt. %; for example, from 20 to 60 wt. %.

For example, the second polymer is selected from a virgin polymer resin, a polymer post-consumer resin, and a blend of a virgin polymer resin and a post-consumer polymer resin.

For example, the second polymer comprises from 5 to 100 wt. % of post-consumer polymer resin based on the total weight of the second polymer; for example, from 20 to 95 wt. %; for example, from 40 to 90 wt. %, for example, from 50 to 85 wt. %; for example, from 60 to 80 wt. %.

In one or more embodiments of any one of the first to the eighth aspect, the first polymer, and/or the second polymer when present, is or comprises a post-consumer resin and the composite material comprises from 5 to 98 wt. % of polymer post-consumer resin based on the total weight of the composite material; and the use comprises heating the electrical heating panel and/or the device comprising the composite material for a time of at least 1 min at a temperature ranging:
from Tm−70° C. to Tm−20° C. when the first polymer is one or more semi-crystalline polymers selected from polyethylene and/or polypropylene, wherein Tm is the melting temperature of the first polymer or the melting temperature of the second polymer when present provided that the melting temperature of the second polymer is lower than the one of the first polymer; with preference, from Tm−50° C. to Tm−30° C.; or
from Tg−50° C. to Tg−10° C. when the first polymer is one or more amorphous polymers wherein Tg is the glass transition temperature of the first polymer or the glass transition temperature of the second polymer when present provided that the glass transition temperature of the second polymer is lower than the one of the first polymer; with preference, from Tg−40° C. to Tg−20° C.

The use of one or more heating steps allows reducing the content of volatile organic compounds (VOC) coming from the one or more post-consumer resins. Indeed, odour is one of the problems commonly encountered with the use of post-consumer resins. Performing such a heating step allows introducing post-consumer resins in the passenger compartment of a motor vehicle, such as a car, a bus or a truck, without negatively affecting the comfort of the users of the said motor vehicle.

Therefore, in one or more embodiment, the use is conducted for a time sufficient to result in the odour being improved as measured through the short-chain content (volatiles) by a thermodesorption analysis (TDA) coupled with a chromatography analysis.

In one or more embodiments, the first polymer is semi-crystalline and is or comprises a first polypropylene resin.

With preference, one or more of the following can be used to further define the first polypropylene resin:
The first polypropylene resin is selected from isotactic polypropylene resin and a syndiotactic polypropylene resin; for example, the first polypropylene resin is an isotactic polypropylene resin.
The first polypropylene resin is selected from virgin polypropylene resin, a polypropylene post-consumer resin and a blend of a virgin polypropylene resin and a polypropylene post-consumer resin.
The first polypropylene resin is present in the composite material at a content ranging from 5 to 98 wt. % based on the total weight of the composite material; for example, from 10 to 96 wt. %; for example, from 20 to 95 wt. %; for example, from 30 to 94 wt. %; for example, from 40 to 93 wt. %.
The first polypropylene resin is selected from a propylene homopolymer, a copolymer of propylene with one or more comonomers selected from ethylene and 04-020 alpha-olefins, an heterophasic polypropylene and any mixture thereof.
The first polypropylene resin is an heterophasic polypropylene consisting of:
  i. from 60 to 95 wt. % based on the total weight of the heterophasic polypropylene of a polypropylene-based matrix selected from a homopolymer and/or a copolymer of propylene with one or more comonomers selected from ethylene and 04-020 alpha-olefins, and
  ii. from 40 to 5 wt. % based on the total weight of the heterophasic polypropylene of a dispersed ethylene-alpha-olefin copolymer;
  for example, the alpha-olefin in the ethylene-alpha-olefin copolymer is selected from the group of alpha-olefins having from 3 to 8 carbon atoms and/or the alpha-olefin in the ethylene-alpha-olefin copolymer is in the range of 25 to 70 wt. % based on the total weight of the ethylene-alpha-olefin copolymer.

In one or more embodiments of any one of the first to the eighth aspect, the first polymer is semi-crystalline and is or comprises a first polypropylene resin, and the carbon particles are carbon nanotubes or comprises at least 65 wt. % of carbon nanotubes based on the total weight of the carbon particles; and at least 75 wt. % of the carbon particles based on the total weight of the carbon particles have an average aspect ratio L/D that is ranging from 100 to 800; with preference from preferably from 100 to 290 or from 140 to 290.

In one or more embodiments of any one of the first to the eighth aspect, the first polypropylene resin has a melt index MI2 ranging from 4 to 260 g/10 min as determined according to ISO 1133 at 230° C. under a load of 2.16 kg; for example, from 5 to 200 g/10 min; for example, from 6 to 180 g/10 min; for example, from 7 to 160 g/10 min, for example, from 8 to 80 g/10 min. With preference, the first polypropylene resin has a melt index MI2 ranging from 4 to 80 g/10 min, or from 80 to 260 g/10 min.

In one or more embodiments of any one of the first to the eighth aspect, the composite material is produced by the direct blend of the carbon particles with the first polymer, and the first polypropylene resin has a melt index MI2 ranging from 80 to 260 g/10 min as determined according to ISO 1133 at 230° C. under a load of 2.16 kg; for example, from 90 to 200 g/10 min; for example, from 100 to 180 g/10 min; for example, from 120 to 160 g/10 min. With preference, the carbon particles are carbon nanotubes or comprises at least 65 wt. % of carbon nanotubes based on the total weight of the carbon particles; and at least 75 wt. % of the carbon particles based on the total weight of the carbon particles have an average aspect ratio L/D that is ranging from 100 to 800; with preference from preferably from 100 to 290 or from 140 to 290.

In one or more embodiments of any one of the first to the eighth aspect, the carbon particles are carbon nanotubes wherein at least 75 wt. % of the carbon particles based on the total weight of the carbon particles have an average aspect ratio L/D that is ranging from 100 to 800; with preference from 100 to 290 or from 140 to 290

In one or more embodiments of any one of the first to the eighth aspect, the carbon particles are provided in a form of a masterbatch comprising the blend of carbon particles in a content ranging from 4.0 wt. % to 30.0 wt. % as determined according to ISO 11358:2014 and based on the total weight of said masterbatch; and a second polypropylene resin; and the first polypropylene resin has a melt index MI2 ranging from 4 to 260 g/10 min as determined according to ISO 1133 at 230° C. under a load of 2.16 kg; for example, from 5 to 200 g/10 min; for example, from 6 to 180 g/10 min; for example, from 7 to 160 g/10 min, for example, from 8 to 80 g/10 min.

In one or more embodiments of any one of the first to the eighth aspect, the carbon particles are provided in a form of a masterbatch comprising the blend of carbon particles in a content ranging from 4.0 wt. % to 30.0 wt. % as determined according to ISO 11358:2014 and based on the total weight of said masterbatch; and a second polypropylene resin; and the first polypropylene resin has a melt index MI2 ranging from 4 to 80 g/10 min as determined according to ISO 1133 at 230° C. under a load of 2.16 kg; for example, from 5 to 50 g/10 min; for example, from 6 to 40 g/10 min; for example, from 7 to 30 g/10 min; for example, from 8 to 25 g/10 min.

One or more of the following can be used to further define the second polypropylene resin of the composite material:
The second polypropylene resin is selected from isotactic polypropylene resin and a syndiotactic polypropylene resin; for example, the second polypropylene resin is an isotactic polypropylene resin.
the second polypropylene resin is selected from a virgin polypropylene resin, a polypropylene post-consumer resin, and a blend of a virgin polypropylene resin and a polypropylene post-consumer resin.
The second polypropylene resin is selected from a propylene homopolymer and/or a copolymer of propylene with one or more comonomers selected from ethylene and $C_4$-$C_{20}$ alpha-olefins; for example, the second polypropylene resin is a propylene homopolymer.
The second polypropylene resin has a melt index MI2 ranging from 80 to 260 g/10 min as determined according to ISO 1133 at 230° C. under a load of 2.16 kg; for example, from 90 to 200 g/10 min; for example, from 100 to 180 g/10 min; for example, from 120 to 160 g/10 min.
The second polypropylene resin is present in the composite material in a content ranging from 5 to 90 wt. % based on the total weight of the composite material, for example, from 10 to 80 wt. %; for example, from 15 to 70 wt. %; for example, from 20 to 60 wt. %.

In one or more embodiments of any one of the first to the eighth aspect, the first polypropylene resin and/or the second polypropylene resin is or comprises one or more polypropylene post-consumer resins; for example, the first polypropylene resin and/or the second polypropylene resin comprises from 5 to 100 wt. % of polypropylene post-consumer resin based on the total weight of the polypropylene resin; for example, from 20 to 95 wt. %; for example, from 40 to 90 wt. %, for example, from 50 to 85 wt. %; for example, from 60 to 80 wt. %.

In one or more embodiments of any one of the first to the eighth aspect, the first polypropylene resin:
comprises from 20 to 95 wt. % of polypropylene post-consumer resin based on the total weight of the first polypropylene resin; for example, from 40 to 90 wt. %; for example, from 50 to 85 wt. %; for example, from 60 to 80 wt. %; and/or
is or comprises a post-consumer resin; wherein the polypropylene post-consumer resin has an MI2 ranging from 4 to 260 g/10 min as determined according to ISO 1133 at 230° C. under a load of 2.16 kg; for example, from 5 to 200 g/10 min; for example, from 6 to 180 g/10 min; for example, from 7 to 160 g/10 min, for example, from 8 to 80 g/10 min; and/or
is or comprises a post-consumer resin; wherein the post-consumer resin is a blend of recycled polypropylene and recycled polyethylene, wherein the content of the recycled polyethylene is ranging from 3 to 25 wt. % relative to the total weight of the post-consumer resin.

In one or more embodiments of any one of the first to the eighth aspect, wherein the composition comprises a second polypropylene resin, the one or more of the following can be used:
the second polypropylene resin comprises from 20 to 95 wt. % of polypropylene post-consumer resin based on the total weight of the second polypropylene resin; for example, from 40 to 90 wt. %; for example, from 50 to 85 wt. %; for example, from 60 to 80 wt. %; and/or
the second polypropylene resin is or comprises a polypropylene post-consumer resin, and the polypropylene post-consumer resin has an MI2 ranging from 80 to 260 g/10 min as determined according to ISO 1133 at 230° C. under a load of 2.16 kg; for example, from 90 to 200 g/10 min; for example, from 100 to 180 g/10 min; for example, from 120 to 160 g/10 min; and/or
the second polypropylene resin is or comprises a post-consumer resin; and the post-consumer resin is a blend of recycled polypropylene and recycled polyethylene, wherein the content of the recycled polyethylene is ranging from 3 to 25 wt. % relative to the total weight of the post-consumer resin.

In one or more embodiments, the first polymer is semi-crystalline and is or comprises a first polyethylene resin.

With preference, one or more of the following can be used to further define the first polyethylene resin:
The first polyethylene resin has a melt index MI2 ranging from 0.1 to 100 g/10 min as determined according to ISO 1133 at 190° C. under a load of 2.16 kg; preferably from 4 to 25 g/10 min.
The first polyethylene resin has a density ranging from 0.900 g/cm$^3$ to 0.960 g/cm$^3$ as determined according to ISO 1183 at a temperature of 23° C.

The first polyethylene resin is selected from a polyethylene homopolymer, a copolymer of ethylene with one or more comonomers selected from $C_3$-$C_{20}$ alpha-olefins and any mixture thereof.

The first polyethylene resin is selected from a virgin polyethylene resin, a polyethylene post-consumer resin and a blend of a virgin polyethylene resin and a polyethylene post-consumer resin.

The first polyethylene resin is present in the composite material at a content ranging from 5 to 98 wt. % based on the total weight of the composite material; for example, from 10 to 96 wt. %; for example, from 20 to 95 wt. %; for example, from 30 to 94 wt. %; for example, from 40 to 93 wt. %.

In one or more embodiments of any one of the first to the eighth aspect, the first polymer is semi-crystalline and is or comprises a first polyethylene resin, and the carbon particles are carbon nanotubes or comprises at least 65 wt. % of carbon nanotubes based on the total weight of the carbon particles; and at least 75 wt. % of the carbon particles based on the total weight of the carbon particles have an average aspect ratio L/D that is ranging from 100 to 800; with preference from preferably from 100 to 290 or from 140 to 290.

In one or more embodiments of any one of the first to the eighth aspect, the composite material is produced the direct blend of the carbon particles with the first polymer, the first polyethylene resin is preferably selected to have a melt index MI2 ranging from 4 to 100 g/10 min as determined according to ISO 1133 at 190° C. under a load of 2.16 kg; for example, from 5 to 80 g/10 min; for example, from 6 to 50 g/10 min; for example, from 4 to 40 g/10 min; for example, from 4 to 25 g/10 min; for example, from 5 to 20 g/10 min.

In one or more embodiments of any one of the first to the eighth aspect, the carbon particles are carbon nanotubes wherein at least 75 wt. % of the carbon particles based on the total weight of the carbon particles have an average aspect ratio L/D that is ranging from 100 to 800; with preference from 100 to 290 or from 140 to 290.

In one or more embodiments of any one of the first to the eighth aspect, the carbon particles are provided in a form of a masterbatch; the first polyethylene resin has a melt index MI2 ranging from 0.1 to 100 g/10 min as determined according to ISO 1133 at 190° C. under a load of 2.16 kg; for example, from 0.5 to 80 g/10 min; for example, from 1 to 50 g/10 min; for example, from 2 to 40 g/10 min, for example, from 3 to 30 g/10 min; for example, from 4 to 25 g/10 min; for example, from 5 to 20 g/10 min.

In one or more embodiments of any one of the first to the eighth aspect, the carbon particles are provided in a form of a masterbatch; and the first polyethylene resin has a melt index MI2 ranging from 0.1 to 20 g/10 min as determined according to ISO 1133 at 190° C. under a load of 2.16 kg; for example, from 0.5 to 15 g/10 min; for example, from 0.8 to 10 g/10 min; for example, from 1 to 9 g/10 min; for example, from 2 to 8 g/10 min.

In one or more embodiments of any one of the first to the eighth aspect, the carbon particles are provided in a form of a masterbatch comprising the blend of carbon particles and a second polymer; wherein the second polymer is or comprises a second polyethylene resin.

With preference, one or more of the following can be used to further define the second polyethylene resin:

The second polyethylene resin has an MI2 ranging from 4 to 100 g/10 min as determined according to ISO 1133 at 190° C. under a load of 2.16 kg.

The second polyethylene resin is selected from a virgin polyethylene resin, a polyethylene post-consumer resin, and a blend of a virgin polyethylene resin and a polyethylene post-consumer resin.

The second polyethylene resin is present in the composite material in a content ranging from 5 to 90 wt. % based on the total weight of the composite material, for example, from 10 to 80 wt. %; for example, from 15 to 70 wt. %; for example, from 20 to 60 wt. %.

In one or more embodiments of any one of the first to the eighth aspect, the first polyethylene resin and/or the second polyethylene resin comprises one or more polyethylene post-consumer resins; for example, the first polyethylene resin and/or the second polyethylene resin comprises from 5 to 100 wt. % of polyethylene post-consumer resin based on the total weight of the polyethylene resin; for example, from 20 to 95 wt. %; for example, from 40 to 90 wt. %, for example, from 50 to 85 wt. %; for example, from 60 to 80 wt. %.

In one or more embodiments of any one of the first to the eighth aspect, the first polyethylene resin:
comprises from 20 to 95 wt. % of polyethylene post-consumer resin based on the total weight of the first polyethylene resin; for example, from 40 to 90 wt. %; for example, from 50 to 85 wt. %; for example, from 60 to 80 wt. %; and/or
is or comprises a post-consumer resin; wherein the polyethylene post-consumer resin has an MI2 ranging from 0.1 to 100 g/10 min as determined according to ISO 1133 at 190° C. under a load of 2.16 kg; for example, from 0.5 to 80 g/10 min; for example, from 1 to 50 g/10 min; for example, from 2 to 40 g/10 min, for example, from 3 to 30 g/10 min; for example, from 4 to 25 g/10 min; for example, from 5 to 20 g/10 min; and/or
is or comprises a post-consumer resin; wherein the post-consumer resin is a blend of recycled polypropylene and recycled polyethylene, wherein the content of the recycled polypropylene is ranging from 3 to 25 wt. % relative to the total weight of the post-consumer resin.

In one or more embodiments of any one of the first to the eighth aspect, wherein the composition comprises a second polyethylene resin, the one or more of the following can be used:
the second polyethylene resin comprises from 20 to 95 wt. % of polyethylene post-consumer resin based on the total weight of the second polyethylene resin; for example, from 40 to 90 wt. %; for example, from 50 to 85 wt. %; for example, from 60 to 80 wt. %; and/or
the second polyethylene resin is or comprises a polyethylene post-consumer resin; and the polyethylene post-consumer resin has an MI2 ranging from 4 to 100 g/10 min as determined according to ISO 1133 at 190° C. under a load of 2.16 kg; for example, from 5 to 80 g/10 min; for example, from 6 to 50 g/10 min; for example, from 4 to 25 g/10 min; for example, from 5 to 20 g/10 min; and/or
the second polyethylene resin is or comprises a post-consumer resin; and the post-consumer resin is a blend of recycled polypropylene and recycled polyethylene, wherein the content of the recycled polypropylene is ranging from 3 to 25 wt. % relative to the total weight of the post-consumer resin.

In one or more embodiments, the first polymer is semi-crystalline and is or comprises a first amorphous polymer.

In one or more embodiments of any one of the first to the eighth aspect, the first polymer is or comprises an amorphous polymer selected from polystyrene, acrylonitrilebutadiene-styrene, polycarbonate, styrene acrylonitrile, poly(methyl methacrylate), poly(vinyl chloride), polybutadiene, polybutylene terephthalate, poly(p-phenylene oxide), polysulfone, polyethersulfone, polyethylenimine, polyphenylsulfone, acrylonitrile styrene acrylate or any combination thereof; preferably the first polymer is polystyrene and selected from polystyrene, modified polystyrene, or combination of polystyrene and modified polystyrene.

In one or more embodiments of any one of the first to the eighth aspect, the first polymer is or comprises an amorphous polymer having a high load melt flow index HLMI of more than 30 g/10 min according to IS01 133 (21.6 kg–200° C.), preferably more than 40 g/10 min, preferably more than 50 g/10 min; and/or is or comprises a post-consumer amorphous polymer resin.

In one or more embodiments of any one of the first to the eighth aspect, the composite material is produced by the direct blend of the carbon particles with the first polymer, and the first amorphous resin is preferably selected to have an MFI at least 10 g/10 min as measured at 200° C. under a load of 5 kg according to ISO1133; and/or the carbon particles are carbon nanotubes wherein at least 75 wt. % of the carbon particles based on the total weight of the carbon particles have an average aspect ratio L/D that is ranging from 100 to 800; with preference from 100 to 290 or from 140 to 290.

In one or more embodiments of any one of the first to the eighth aspect, the carbon particles are provided in a form of a masterbatch comprising the blend of carbon particles and a second polymer; wherein the second polymer is or comprises a second amorphous polymer resin similar or different from the first amorphous polymer resin; with preference, the second amorphous polymer resin has an MFI at least 10 g/10 min as measured at 200° C. under a load of 5 kg according to ISO1133; and/or is or comprises a post-consumer amorphous polymer.

In one or more embodiments of any one of the first to the eighth aspect, the first amorphous resin and/or the second amorphous resin is selected from a virgin amorphous resin, an amorphous resin post-consumer resin and a blend of a virgin amorphous resin and an amorphous resin post-consumer resin.

In one or more embodiments of any one of the first to the eighth aspect, the first amorphous resin is present in the composite material at a content ranging from 5 to 98 wt. % based on the total weight of the composite material; for example, from 10 to 96 wt. %; for example, from 20 to 95 wt. %; for example, from 30 to 94 wt. %; for example, from 40 to 93 wt. %.

In one or more embodiments of any one of the first to the eighth aspect, the second amorphous resin is present in the composite material in a content ranging from 5 to 90 wt. % based on the total weight of the composite material, for example, from 10 to 80 wt. %; for example, from 15 to 70 wt. %; for example, from 20 to 60 wt. %.

DETAILED DESCRIPTION

Figure 1:
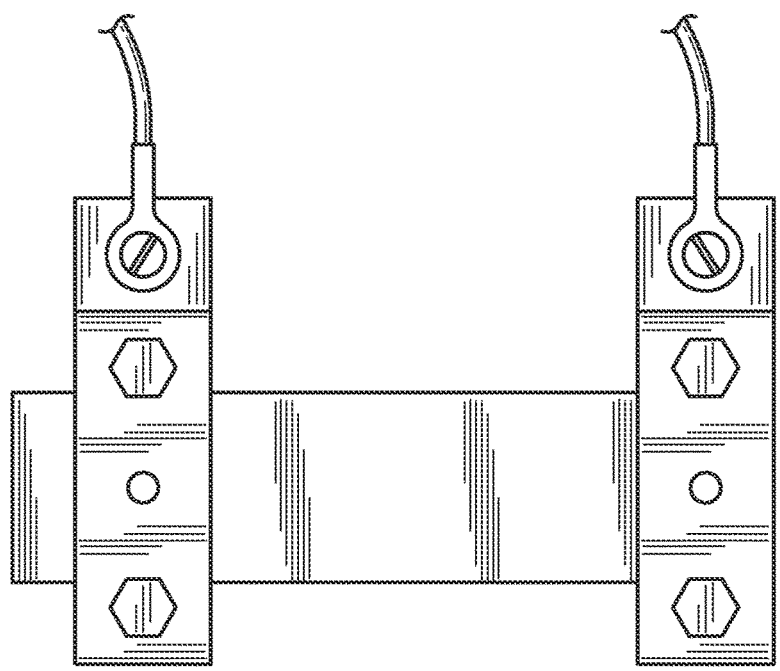
FIG. 1 is a picture illustrating the conditions of the test

When describing the polymers, composite material, electrical heating panels, uses and processes of the disclosure, the terms employed are to be construed in accordance with the following definitions, unless a context dictates otherwise.

For the purpose of the disclosure, the following definitions are given:

As used herein, the term "catalyst" refers to a substance that causes a change in the rate of a polymerization reaction. In the present disclosure, it is especially applicable to catalysts suitable for the polymerization of propylene to polypropylene.

As used herein, a "polymer" is a polymeric compound prepared by polymerizing monomers, whether of the same or of a different type. The generic term polymer thus embraces the term homopolymer, usually employed to refer to polymers prepared from only one type of monomer, and the terms copolymer and interpolymer as defined below.

As used herein, a "copolymer", "interpolymer" and like terms mean a polymer prepared by the polymerization of at least two different types of monomers. These generic terms include polymers prepared from two or more different types of monomer, e.g. terpolymers, tetrapolymers, etc.

As used herein, "blend", "polymer blend" and like terms refer to a composition of two or more compounds, for example, two or more polymers or one polymer with at least one other compound.

As used herein, the term "melt blending" involves the use of shear force, extensional force, compressive force, ultrasonic energy, electromagnetic energy, thermal energy or combinations comprising at least one of the foregoing forces or forms of energy and is conducted in processing equipment wherein the aforementioned forces are exerted by a single screw, multiple screws, intermeshing co-rotating or counter-rotating screws, non-intermeshing co-rotating or counter-rotating screws, reciprocating screws, screws with pins, barrels with pins, rolls, rams, helical rotors, or combinations comprising at least one of the foregoing.

As used herein, the terms "polypropylene" (PP) and "propylene polymer" may be used synonymously. The term "polypropylene" encompasses polypropylene homopolymer resin, as well as copolymers of propylene which can be derived from propylene and a comonomer such as one or more selected from the group consisting of $C_2$ or $C_4$-$C_{20}$ alpha-olefins, such as ethylene, 1-butene, 1-pentene, 1-hexene, 1-octene.

As used herein the terms "polyethylene" (PE) and "ethylene polymer" may be used synonymously. The term "polyethylene" encompasses homopolyethylene as well as copolymer of ethylene which can be derived from ethylene and a comonomer such as one or more selected from the group consisting of $C_3$-$C_{20}$ alpha-olefins, such as 1-butene, 1-propylene, 1-pentene, 1-hexene, 1-octene.

The term "polypropylene resin" or "polyethylene resin" as used herein refers to polypropylene or polyethylene fluff or powder that is extruded, and/or melted and/or pelletized and can be produced through compounding and homogenizing of the polypropylene resin as taught herein, for instance, with mixing and/or extruder equipment. As used herein, the term "polypropylene" may be used as a shorthand for "polypropylene resin".

The term "fluff" or "powder" as used herein refers to polymer material with the hard catalyst particle at the core of each grain and is defined as the polymer material after it exits the polymerization reactor (or the final polymerization reactor in the case of multiple reactors connected in series).

Under normal production conditions in a production plant, it is expected that the melt index (MI2) will be different for the fluff than for the polyethylene resin and for the polypropylene resin. Under normal production conditions in a production plant, it is expected that the density will be slightly different for the fluff, than for the polyethylene resin and for the polypropylene resin. Unless otherwise indicated, density and melt index for the polyethylene resin and for the polypropylene resin refer to the density and melt index as measured on the polyethylene resin and for the polypropylene resin as defined above.

As used herein the terms "composite material" are related to the blend of one or more polymers with carbon particles. In the present application, carbon nanotubes may be referred to as CNT.

The term "carbon particles" as used herein encompasses carbon nanotubes, carbon fibers, carbon black and any combination thereof. wherein carbon nanotubes, carbon fibers may have an average aspect ratio L/D of at least 10 and carbon black has an average aspect ratio L/D of less than 10.

The terms "comprising", "comprises" and "comprised of" as used herein are synonymous with "including", "includes" or "containing", "contains", and are inclusive or open-ended and do not exclude additional, non-recited members, elements or method steps. The terms "comprising", "comprises" and "comprised of" also include the term "consisting of".

The recitation of numerical ranges by endpoints includes all integer numbers and, where appropriate, fractions subsumed within that range (e.g. 1 to 5 can include 1, 2, 3, 4 when referring to, for example, a number of elements, and can also include 1.5, 2, 2.75 and 3.80, when referring to, for example, measurements). The recitation of endpoints also includes the recited endpoint values themselves (e.g. from 1.0 to 5.0 includes both 1.0 and 5.0). Any numerical range recited herein is intended to include all sub-ranges subsumed therein.

As used herein, the term "masterbatch" refers to concentrates of active material (such as the carbon particles) in a polymer, which is intended to be subsequently incorporated into another polymer miscible with the polymer already contained in the masterbatches.

The terms "virgin polypropylene" or "virgin polyethylene" are used to denote a polypropylene or a polyethylene directly obtained from a polymerization plant. The terms "directly obtained" is meant to include that the polypropylene or the polyethylene may optionally be passed through a pelletization step or an additivation step or both.

The terms "Post Consumer Resin", which may be abbreviated as "PCR", is used to denote a component of waste.

Throughout the present application the terms "polypropylene" and "propylene polymer" may be used synonymously. In a similar way, the terms "polyethylene" and "ethylene polymer" may be used synonymously.

According to a first aspect, the disclosure provides the use of a composite material as electro-thermal material in a process for the production of an electrical heating panel, wherein the electrical heating panel comprises at least one device selected from a plate, a sheet or a film, wherein said device has one or more layers wherein at least one layer is a heating layer, remarkable in that the heating layer or at least one heating layer or the one or more heating layers are made of a composite material comprising:
 a first polymer which is one or more amorphous polymer or one or more semi-crystalline polymer selected from polyethylene and/or polypropylene;
 from 2.0 to 20.0 wt. % of carbon particles based on the total weight of the composite material as determined according to ISO 11358:2014; wherein the carbon particles are selected from carbon nanotubes, carbon fibers, carbon black and any combination thereof; wherein at least 75 wt. % of the carbon particles based on the total weight of the carbon particles have an average aspect ratio L/D that is at least 10 or that is ranging from 10 to 800;
 wherein said heating layer or said at least one heating layer has a thickness ranging from 100 μm to 4.0 mm; for example, each of the one or more heating layers has a thickness ranging from 100 μm to 4.0 mm.

According to a second aspect, the present disclosure also provides the use of an electrical heating panel in a motor vehicle, wherein the electrical heating panel comprises at least one device selected from a plate, a sheet or a film, wherein said device has one or more layers wherein at least one layer is a heating layer, and wherein the use comprises applying an electrical voltage ranging from 12 to 48 V to said electrical heating panel; the use being remarkable in that the heating layer or at least one heating layer or the one or more heating layers are made of a composite material comprising:
 a first polymer which is one or more amorphous polymer or one or more semi-crystalline polymer selected from polyethylene and/or polypropylene;
 from 2.0 to 20.0 wt. % of carbon particles based on the total weight of the composite material as determined according to ISO 11358:2014; wherein the carbon particles are selected from carbon nanotubes, carbon fibers, carbon black and any combination thereof; wherein at least 75 wt. % of the carbon particles based on the total weight of the carbon particles have an average aspect ratio L/D that is at least 10 or that is ranging from 10 to 800;
 wherein said heating layer or said at least one heating layer has a thickness ranging from 100 μm to 4.0 mm; for example, each of the one or more heating layers has a thickness ranging from 100 μm to 4.0 mm.

With preference, the use according to the second aspect is in the passenger compartment of the motor vehicle.

The disclosure also encompasses the use of an electrical heating panel produced by a process involving the use according to the first aspect in a de-icing device; for example, in an airplane.

According to another aspect, the disclosure provides for an electrical heating panel, wherein the electrical heating panel comprises at least one device selected from a plate, a sheet or a film, wherein said device has one or more layers wherein at least one layer is a heating layer, remarkable in that the one or more heating layers are made of a composite material comprising:
 a first polymer which is one or more amorphous polymers or one or more semi-crystalline polymers selected from polyethylene and/or polypropylene;
 from 2.0 to 20.0 wt. % of carbon particles based on the total weight of the composite material as determined according to ISO 11358:2014; wherein the carbon particles are selected from carbon nanotubes, carbon fibers, carbon black and any combination thereof;

wherein at least 75 wt. % of the carbon particles based on the total weight of the carbon particles have an average aspect ratio L/D that is ranging from 10 to 800;
wherein each of the one or more heating layers has a thickness ranging from 100 µm to 4.0 mm.

The disclosure encompasses a motor vehicle comprising one or more electrical heating panels according to the present disclosure or involving the use according to the second aspect. For example, the motor vehicle comprises a passenger compartment and the one or more electrical heating panel are within the passenger compartment. For example, the motor vehicle is an airplane and the one or more electrical heating panels are a part of a de-icing device.

The disclosure further encompasses a de-icing device remarkable in that it comprises one or more electrical heating panels according to the disclosure.

According to another aspect, the disclosure provides for a process for the production of an electrical heating panel according to the disclosure, wherein the electrical heating panel comprises at least one device selected from a plate, a sheet or a film; wherein said device has one or more layers wherein at least one layer is a heating layer; the process is remarkable in that comprises a step of providing a composite material comprising:
  a first polymer which is one or more amorphous polymers or one or more semi-crystalline polymers selected from polyethylene and/or polypropylene;
  from 2.0 to 20.0 wt. % of carbon particles based on the total weight of the composite material as determined according to ISO 11358:2014; wherein the carbon particles are selected from carbon nanotubes, carbon fibers, carbon black and any combination thereof; wherein at least 75 wt. % of the carbon particles based on the total weight of the carbon particles have an average aspect ratio L/D that is ranging from 10 to 800;
  and a step of producing at least one device, wherein one or more heating layers are made from the composite material and wherein each of the one or more heating layers has a thickness ranging from 100 µm to 4.0 mm. For example, the above process involves the use according to the first aspect.

The below description is related to the use according to the first aspect and/or to the second aspect since the electrical heating panel of the use according to the second aspect is preferably produced by a process involving the use according to the first aspect. The below description is also related to an electrical heating panel and to a process for the production of an electrical heating panel according to the disclosure.

In the present disclosure, the electrical heating panel can be formed by a single device having one or more layers wherein at least one layer is a heating layer made of the composite material. With preference, the electrical heating panel is an assembly comprising at least one additional plate and/or at least one additional sheet and/or one additional film, different from the device having one or more layers wherein at least one layer is a heating layer made of the composite material. For example, the electrical heating panel is an assembly comprising at least one additional sheet made of a metallic material and/or one additional film is made of a polymeric material forming an insulating layer.

The electrical heating panel further comprises two electrodes in contact with the heating layer; with preference, the distance I between the two electrodes is preferably ranging from 5 to 50 cm; more preferably ranging from 6 to 40 cm, even more preferably from 7 to 35 cm and most preferably from 8 to 30 cm.

In one or more embodiment the heating layer is configured to show a defined heating power at a given voltage so that a desired minimal heating power $HP_{min}$ is targeted when selecting the thickness of the device, the distance between the electrodes and the content of the carbon particles. According to the disclosure, the minimal heating power desired $HP_{min}$ is preferably ranging from 200 W/m$^2$ to 4000 W/m$^2$; more preferably ranging from 500 W/m$^2$ to 3500 W/m$^2$; even more preferably ranging from 1000 W/m$^2$ to 3000 W/m$^2$; and most preferably ranging from 1200 W/m$^2$ to 2500 W/m$^2$.

For clarity reasons; the device having one or more layers wherein at least one layer or the one or more heating layers are a heating layer that is made of a composite material comprising:
  a first polymer which is one or more amorphous polymers or one or more semi-crystalline polymers selected from polyethylene and/or polypropylene;
  from 2.0 to 20.0 wt. % of carbon particles based on the total weight of the composite material as determined according to ISO 11358:2014; wherein the carbon particles are selected from carbon nanotubes, carbon fibers, carbon black and any combination thereof; wherein at least 75 wt. % of the carbon particles based on the total weight of the carbon particles have an average aspect ratio L/D that is at least 10 or ranging from 10 to is hereafter named "the device". The device is selected from a plate, a sheet and a film.

The sheet and/or the plate is defined to have a thickness ranging from 100 µm to 5.0 mm; for example, a thickness ranging from 100 µm to 4.0 mm; for, example, from 250 µm to 3.5 mm; preferably from 300 µm to 3.0 mm; more preferably ranging from 0.5 to 2.5 mm; even more preferably ranging from 1.0 to 2.0 mm or from 100 µm to 0.5 mm.

The film is defined to have a thickness ranging from 100 µm to 600 µm, for example, a thickness ranging from 100 µm to 500 µm; for, example, from 150 µm to 450 µm; preferably from 200 µm to 400 µm; more preferably ranging from 250 µm to 350 µm.

According to the disclosure, the plate is produced by compression moulding or by injection moulding; with preference, by injection moulding. Therefore, the plate is a compression moulded article or an injection moulded article. According to the disclosure, the sheet is produced by extrusion Therefore, the sheet is an extruded article. According to the disclosure, the film is a blown film or a cast film.

The device can be monolayered and comprises only the heating layer. Alternatively, the device is multi-layered and comprises at least one heating layer and at least one insulating layer wherein the insulating layer is made of a third polymer that is the same than the first polymer or that is different from the first polymer provided it is of the same nature. For example, in case the first polymer is polypropylene, the third polymer will be polypropylene. In case the first polymer is polyethylene, the third polymer will be polyethylene. In case the first polymer is polystyrene, the third polymer will be polystyrene. With preference, the third polymer is the same than the first polymer.

For example, the device comprises one heating layer. In such embodiment, the device can be monolayered or the device can be multi-layered and comprises a single heating layer and at least one insulating layer wherein the insulating layer is made of a third polymer that is the same than the first polymer or that is different from the first polymer provided it is of the same nature.

With preference, the device is multi-layered and contains only one heating layer and one or more insulating layers. For example, the device is bi-layered and comprises one heating layer and one support layer. For example, the device is tri-layered and comprises one heating layer sandwiched between two insulating layers; i.e., wherein one insulating layer is on the top, one heating layer is in the middle and one insulating layer is on the bottom.

It is preferred that the insulating layer is devoid of conductive particles; with preference the conductive particles are selected from one or more of carbon particles, carbon-coated particles, metal particles, metal oxide particles, alloy particles, metal-coated glass particles, metal-coated polymer particles, conductive polymer-coated particles and graphene nanoplatelets (GNPs). For example, the insulating layer is devoid of conductive particles being metal particles wherein the metal may be selected from, for example, copper, silver, nickel, aluminium, titanium, zinc and/or gold. The insulating layer is devoid of conductive particles being one or more of silver particles (e.g. silver flakes) and/or silver-coated glass particles.

When multilayer sheet, such as bilayer sheets, are considered, the sheets can be produced by bi-extrusion or multi-extrusion processes. When multilayer plates, such as bilayer plates, are considered, the plates can be produced by bi-injection processes as known by the person skilled in the art.

When multilayer film is considered, the film may be formed by any number of well-known coextrusion techniques to make a cast or blown film. Any of the blown or chill roll techniques commonly used are suitable. For example, the resins of each layer can be co-extruded in a molten state through a flat die and then cooled to form the multilayer film. Alternatively, the resins of each layer can be co-extruded in a molten state through an annular die and then blown and cooled to form a tubular, blown film, which can then be axially slit and unfolded to form a flat multilayer film.

The heating layer or at least one heating layer has a thickness ranging from 100 µm to 4.0 mm, 250 µm to 3.5 mm; preferably from 300 µm to 3.05 mm; more preferably ranging from 0.5 to 2.5 mm; even more preferably ranging from 1.0 to 2.0 mm.

In an embodiment, the heating layer or at least one heating layer has a thickness ranging from 100 µm to 1.0 mm; for example, 100 µm to 800 µm, for example, a thickness ranging from 100 µm to 600 µm; for, example, from 150 µm to 500 µm; preferably from 200 µm to 450 µm; more preferably ranging from 250 µm to 350 µm. Indeed, it was found that the use of thin layer as a heating layer in the device, allows for faster heating of the electrical heating panel.

The heating layer or at least one heating layer has a thickness of at least 100 µm; for example, of at least 150 µm, for example, of at least 200 µm, for example, of at least 250 µm, preferably of at least 300 µm, more preferably of at least 400 µm, even more preferably of at least 0.5 mm, most preferably of at least 0.8 mm, even most preferably of at least 1.0 mm or of at least 1.1 mm.

The heating layer or at least one heating layer has a thickness of at most 4.0 mm, preferably of at most 3.5 mm, more preferably of at most 3.0 mm, even more preferably of at most 2.8 mm, most preferably of at most 2.5 mm, even most preferably of at most 2.0 mm or of at most 1.9 mm; for example, at most 1.5 mm; for example, at most 1.0 mm; for example, at most 800 µm; for example, at most 600 µm; for example, at most 500 µm; for example, at most 450 µm; for example, at most 350 µm.

It has been found that in order to improve the speed of heating, at similar surface, voltage, type and content of carbon particles, the person skilled in the art can reduce the thickness of the heating layer or at least one heating layer.

Selection of the Carbon Particles and of the Content of the Carbon Particles

The carbon particles are selected from carbon nanotubes, carbon fibers, nanographene, carbon black and any combination thereof; preferably from carbon nanotubes, carbon fibers, carbon black and any combination thereof; more preferably from carbon nanotubes, carbon fibers and any combination thereof; even more preferably carbon particles are or comprise carbon nanotubes.

The composite material comprises from 2.0 to 20.0 wt. % carbon particles based on the total weight of the composite material as determined according to ISO 11358:2014, for example, from 4.0 to 18.0 wt. % of or from 5.0 to 16.0 wt. % based on the total weight of the composite material; preferably, from 6.0 to 15.0 wt. % or from 6.5 to 14.0 wt. %; more preferably from 7.0 to 13.0 wt. %; even more preferably from 7.5 to 12.0 wt. %, and most preferably from 8.0 to 11.0 wt. %.

According to the disclosure, the carbon particles are selected to have a high average aspect ratio L/D (i.e., a length to diameter ratio L/D), so that at least 75 wt. % of the carbon particles based on the total weight of the carbon particles have an average aspect ratio L/D that is at least 10 or ranging from 10 to 800. Suitable content can be obtained by blending carbo particles having different average aspect ratio L/D. For example, by blending carbon particles having an average aspect ratio L/D that is at least 10 or ranging from 10 to 800 with carbon black, since carbon black is having an average aspect ratio L/D of less than 10, wherein the content of the carbon black is at most 25 wt. % based on the total weight of the carbon particles.

In general, carbon nanotubes, carbon fibers, nanographene have an average aspect ratio of at least 10.

Therefore, when carbon black is present, its content is at most 25.0 wt. % based on the total weight of the carbon particles; for example, at most 20.0 wt. %, for example, at most 15.0 wt. %; for example, at most 10.0 wt. %; for example, at most 8.0 wt. %; for example, at most 5.0 wt. %; for example, at most 3.0 wt. %; for example, at most 1.0 wt. %. With preference, the carbon particles are devoid of carbon black.

For example, at least 75 wt. % of the carbon particles based on the total weight of the carbon particles have an average aspect ratio L/D that is ranging from 50 to 800 or from 80 to 700; preferably, from 100 to 600; more preferably, from 120 to 800; even more preferably from 130 to 450; and most preferably from 100 to 290 or from 140 to 290.

For example, at least 85 wt. % of the carbon particles based on the total weight of the carbon particles have an average aspect ratio L/D that is ranging from 50 to 800 or from 80 to 700; preferably, from 100 to 600; more preferably, from 120 to 800; even more preferably from 130 to 450; and most preferably from 100 to 290 or from 140 to 290.

For example, at least 95 wt. % of the carbon particles based on the total weight of the carbon particles have an average aspect ratio L/D that is ranging from 50 to 800 or from 80 to 700; preferably, from 100 to 600; more preferably, from 120 to 800; even more preferably from 130 to 450; and most preferably from 100 to 290 or from 140 to 290.

For example, 100 wt. % of the carbon particles based on the total weight of the carbon particles have an average aspect ratio L/D that is ranging from 50 to 800 or from 80 to 700; preferably, from 100 to 600; more preferably, from 120 to 800; even more preferably from 130 to 450; and most preferably from 100 to 290 or from 140 to 290.

The cost is one of the numerous interests of using carbon particles having an average aspect ratio L/D that is ranging from 120 to 800; preferably from 130 to 450; and more preferably from 100 to 290 or from 140 to 290.

In one or more embodiments of any one of the first to the eighth aspect, the electrical heating panel further comprises two electrodes in contact with the heating layer, and the content of carbon particles in the composite material is selected to comply with the formula:

$$wt.\% \text{ carbon particles} \geq -\frac{1}{a} * \ln\left[\frac{U^2 * h}{b * HP_{min} * l^2}\right]$$

wherein:
U is the voltage intended to be applied to the electrical heating panel; preferably U is ranging from 12 to 48 V;
$HP_{min}$ is the minimal heating power desired; preferably $HP_{min}$ is ranging from 200 W/m² to 4000 W/M²;
h is the thickness of the heating layer and is ranging from 100 μm to 4.0 mm;
l is the distance between the two electrodes; preferably l is ranging from 5 to 50 cm;
a is at least 0.5, preferably a is ranging from 0.5 to 1.2
b is at least 2, preferably b is ranging from 2 to 800;
and wherein at least 75 wt. % of the carbon particles based on the total weight of the carbon particles have an average aspect ratio L/D ranging from 100 to 290 or from 140 to 290.

It was found that a proper selection of the carbon particle aspect ratio and content allows achieving positive temperature coefficient properties (PTC properties) to determined temperature or range of temperature. As it is shown in the examples, it is possible to design device for electrical heating panels wherein the one or more heating layers have PTC properties by reaching stable temperatures ranging from 40° C. to 120° C., i.e., well below the melting point of the first polymer when being polypropylene.

As it is shown in the examples, a and b are coefficient that are determined experimentally and that are related to the resistivity of the composite material wherein the resistivity is defined according to the following formula $\rho = b * \exp(-a * wt.\% \text{ carbon particles})$ It has been found that below a given content of carbon particles within the composite material, the coefficient a and b vary according to the process used to produce the device, For example, an injected moulded plate needs more carbon particles to achieve the desired heating power than a similar plate when produced by compression moulding.

For example, in the operating conditions of the examples (blend of polypropylene with CNT having an average aspect ratio L/D ranging from 150 to 160), the following coefficient were determined:
for compressed plates: a=0.539 and b=2.05
for extruded sheets: a=1.06 and b=159.8
for injected plates: a=1.16 and b=796

This means that to achieve a desired heating power, more carbon particles may be required in injected plates by comparison to compressed plates.

For example, when the first polymer is polypropylene and the carbon particles are 100 wt. % carbon nanotubes having an average aspect ratio L/D ranging from 100 to 290 or from 140 to 290, the effects of the process selected for the production of the device will be of less relevance when the content of carbon nanotubes is 10 wt. % or more.

Because of the potential effect of the production process, in case the desired minimal heating power is not obtained immediately, the person skilled in the art may raise the content of carbon particles in the composite material and/or the average aspect ratio L/D of the carbon particles used in the composite material and/or the content of the carbon particles of the said average aspect ratio L/D. Other possibilities available to persons skilled in the art to increase heating power are to raise the voltage (if not already at 48 V) and/or to reduce the thickness of the heating layer.

Indeed, it was found that the a and b coefficient also vary with average aspect ratio L/D and with the geometry (surface and thickness) of the heating layer. For example, a coefficient lower than 0.5 and/or b coefficient lower than 2 may be considered for carbon particle of higher average aspect ratio L/D.

Regarding the distance between the two electrodes, it was found that reducing the distance between the two electrodes allows reducing the content in carbon particles within the composite material.

With preference, the above formula is used with the carbon particles being carbon nanotubes or comprising at least 65 wt. % of carbon nanotubes based on the total weight of the carbon particles; preferably, at least 85 wt. % of carbon nanotubes; and/or the above formula is used with at least 75 wt. % of the carbon particles based on the total weight of the carbon particles having an average aspect ratio L/D that is ranging from 50 to 800 or from 80 to 700; preferably, from 100 to 600; more preferably, from 120 to 800; even more preferably from 130 to 450; and most preferably from 100 to 290 or from 140 to 290.

The above formula can also be used as a guidance to select the suitable content of carbon particles and the suitable geometry of the device (i.e., the thickness and the surface) in order to achieve a desired stationary temperature. Indeed, as shown in the examples, it was found that for a given geometry and a given voltage, a change in the carbon particles content of the composite material results in a change in the stationary temperature reached.

As a consequence, in one or more embodiments, the use comprises the content of carbon particles in the material to be selected in order to obtain a stationary temperature ranging from 30° C. to Tm−10° C., for semi-crystalline polymers; wherein Tm is the melting temperature of the first polymer or the melting temperature of the second polymer when present provided that the melting temperature of the second polymer is lower than the one of the first polymer. Indeed, the lowest melting temperature is the one to be considered.

In one or more embodiments, the use comprises the first polymer being one or more semi-crystalline polymers selected from polyethylene and/or polypropylene; and the stationary temperature of the heating layer is ranging from 30° C. to Tm−10° C.; for example, ranging from 35° C. to Tm−20° C., for example, ranging from 40° C. to Tm−30° C.; for example, ranging from 50° C. to Tm−40° C.

In one or more embodiments, the use comprises the first polymer being one or more semi-crystalline polymers selected from polyethylene and/or polypropylene and the stationary temperature of the heating layer being at most Tm−10° C.; for example, at most Tm−20° C., for example, at most Tm−30° C.; for example, at most Tm−40° C.

In one or more embodiments, the use comprises the first polymer or one or more semi-crystalline polymers selected from polyethylene and/or polypropylene and the stationary temperature of the heating layer being at least 30° C.; for example, at least 35° C., for example, at least 40° C.; for example, at least 50° C.

Keeping the above requirement regarding the melting temperature in mind, in one or more embodiments, the use comprises the first polymer being one or more semi-crystalline polymers selected from polyethylene and/or polypropylene and the stationary temperature of the heating layer is at most 140° C. or at most 120° C.; for example, at most 100° C., for example, at most 90° C.; for example, at most 80° C.

In one or more embodiments, the use comprises the first polymer being one or more semi-crystalline polymers selected from polyethylene and/or polypropylene; and the stationary temperature of the heating layer is ranging from 30° C. to 140° C.; ranging from 30° C. to 120° C. for example, ranging from 35° C. to 100° C., for example, ranging from 40° C. to 90° C.; for example, ranging from 50° C. to 80° C.

As a consequence, in one or more embodiments, the use comprises the content of carbon particles in the material to be selected in order to obtain a stationary temperature ranging from 30° C. to Tg−10° C., for amorphous polymers; wherein Tg is the glass transition temperature of the first polymer or the glass transition temperature of the second polymer when present provided that the glass transition temperature of the second polymer is lower than the one of the first polymer.

In one or more embodiments, the use comprises the first polymer being one or more amorphous polymers; and the stationary temperature of the heating layer is ranging from 30° C. to Tg−10° C.; for example, ranging from 35° C. to Tg−20° C., for example, ranging from 40° C. to Tg−30° C.; for example, ranging from 50° C. to Tg−40° C.

In one or more embodiments, the use comprises the first polymer being one or more amorphous polymers and the stationary temperature of the heating layer being at most Tg−10° C.; for example, at most Tg−20° C., for example, at most Tg−30° C.; for example, at most Tg−40° C.

In one or more embodiments, the use comprises the first polymer or one or more semi-crystalline polymers selected from polyethylene and/or polypropylene and the stationary temperature of the heating layer being at least 30° C.; for example, at least 35° C., for example, at least 40° C.; for example, at least 50° C.

In a preferred embodiment, the carbon particles are carbon nanotubes or comprise carbon nanotubes. For example, the carbon particles can comprise at least 65 wt. % of carbon nanotubes based on the total weight of the carbon particles; preferably the carbon particles comprise at least 85 wt. % of carbon nanotubes.

Suitable carbon nanotubes used in the present disclosure can generally be characterized by having a size from 1 nm to 5 μm, this definition of size can be limited to two dimensions only, i.e., the third dimension may be outside of these limits. In a preferred example, the carbon nanotubes have an average length of 1.3 μm or more.

Suitable carbon nanotubes also referred to as "nanotubes" herein, can be cylindrical in shape and structurally related to fullerenes, an example, of which is Buckminsterfullerene ($C_{60}$). Suitable carbon nanotubes may be open or capped at their ends. The end cap may, for example, be a Buckminster-type fullerene hemisphere.

Carbon nanotubes can exist as single-walled nanotubes (SWNT) and multi-walled nanotubes (MWNT), i.e., carbon nanotubes having one single wall and nanotubes having more than one wall, respectively. In single-walled carbon nanotubes a one atom thick sheet of atoms, for example, a one atom thick sheet of graphene is rolled seamlessly to form a cylinder. Multi-walled carbon nanotubes consist of a number of such cylinders arranged concentrically. The arrangement, in multi-walled carbon nanotubes, can be described by the so-called Russian doll model, wherein a larger doll opens to reveal a smaller doll.

In an example, the carbon nanotubes are single-walled nanotubes characterized by an outer diameter of at least 0.5 nm, more preferably, of at least 1 nm, and most preferably, of at least 2 nm. Preferably, their outer diameter is at most 50 nm, more preferably, at most 30 nm and most preferably, at most 10 nm. Preferably, the length of single-walled nanotubes is at least 0.1 μm, more preferably, at least 1 μm, even more preferably, at least 10 μm. Preferably, their length is at most 50 μm, more preferably, at most 25 μm.

In an example, the carbon nanotubes are single-walled carbon nanotubes.

In an example, the carbon nanotubes are multi-walled carbon nanotubes, more preferably, multi-walled carbon nanotubes having on average from 5 to 15 walls.

Multi-walled carbon nanotubes are preferably characterized by an outer diameter of at least 1 nm, more preferably, of at least 2 nm, 4 nm, 6 nm or 8 nm, and most preferably, of at least 9 nm. The preferred outer diameter is at most 100 nm, more preferably, at most 80 nm, 60 nm or 40 nm, and most preferably, at most 20 nm. Most preferably, the outer diameter is in the range from 10 nm to 20 nm. The preferred length of the multi-walled nanotubes is at least 50 nm, more preferably, at least 75 nm, and most preferably, at least 100 nm. In an example, the multi-walled carbon nanotubes have an average outer diameter in the range from 10 nm to 20 nm or an average length in the range from 100 nm to 10 μm or both. In an example, the average aspect ratio L/D (length/diameter ratio) is at least 5, preferably, at least 10, preferably, at least 25, preferably, at least 50, preferably, at least 100, and more preferably, higher than 100.

Carbon nanotubes according to the disclosure have a transition metal oxide content of less than 3%, more preferably, less than 2%, and more preferably, less than 1% measured according to Inductively Coupled Plasma Mass Spectrometry (ICP-MS).

In an example, the carbon nanotubes are multi-walled carbon nanotubes, preferably, having an average aspect ratio L/D ranging from 100 to 800; more preferably, preferably from 120 to 600; more preferably from 130 to 450; and most preferably from 100 to 290 or from 140 to 290.

Suitable carbon nanotubes to be used in the present disclosure can be prepared by any method known in the art. Non-limiting examples of commercially available multi-walled carbon nanotubes are Graphistrength™ 100, available from Arkema, Nanocyl™ NC 7000 available from Nanocyl, FloTube™ 9000 available from CNano Technology. Nanocyl™ NC 7000 available from Nanocyl are carbon nanotubes having an average aspect ratio L/D within the range of from 100 to 290 or from 140 to 290.

The First Polymer and the Composite Material

The composite material comprises carbon particles, a first polymer, and optionally a second polymer and/or one or more fillers and/or one or more additives.

The first polymer can be one or more amorphous polymers, or the first polymer can be one or more semi-crystalline polymers selected from polyethylene and/or polypropylene.

For example, the first polymer is present in the composite material at a content ranging from 5 to 98 wt. % based on the total weight of the composite material; for example, from 10 to 96 wt. %; for example, from 20 to 95 wt. %; for example, from 30 to 94 wt. %; for example, from 40 to 93 wt. %.

For example, the first polymer is present in the composite material at a content of at least 5 wt. % based on the total weight of the composite material; for example, of at least 10 wt. %; for example, of at least 20 wt. %; for example, of at least 30 wt. %; for example, of at least 40 wt. %.

For example, the first polymer is present in the composite material at a content of at most 98 wt. % based on the total weight of the composite material; for example, of at most 96 wt. %; for example, of at most 95 wt. %; for example, of at most 94 wt. %; for example, of at most 93 wt. %.

The first polymer can be selected from a virgin polymer resin, a post-consumer polymer resin and a blend of a virgin polymer resin and a post-consumer polymer resin.

For example, the first polymer comprises from 5 to 100 wt. % of post-consumer polymer resin based on the total weight of the first polymer; for example, from 20 to 95 wt. %; for example, from 40 to 90 wt. %, for example, from 50 to 85 wt. %; for example, from 60 to 80 wt. %.

The composite material can comprise from 0 to 50.0 wt. % of one or more fillers based on the total weight of the composite material; preferably from 0.1 to 50.0 wt. %, more preferably from 0.2 wt. % to 40.0 wt. %, even more preferably from 0.5 wt. % to 30.0 wt. %, most preferably from 1.0 wt. % to 20 wt. %, even most preferably from 1.5 wt. % to 15.0 wt. %, or from 2.5 wt. % to 12.5 wt. %, or from 5.0 wt. % to 10.0 wt. %, or from 5.0 wt. % to 15 wt. % or from 7.0 wt. % to 15 wt. %.

In an embodiment, the composite material comprises at least 0.1 wt. % of one or more fillers, as based on the total weight of the composite material, preferably at least 0.5 wt. %, more preferably at least 1.0 wt. %, even more preferably of at least 1.5 wt. %, most preferably at least 2.5 wt. % and even most preferably at least 5.0 wt. %, or at least 7.0 wt. %.

With preference, the composite material comprises at most 50.0 wt. % or at most 40.0 wt. % of one or more fillers, as based on the total weight of the one or more fillers, preferably at most 30 wt. %, more preferably at most 20 wt. %, even more preferably at most 15 wt. %, most preferably at most 12.5 wt. % or at most 10.0 wt. %.

With preference, the one or more fillers are one or more reinforcement materials selected from talc mineral filler, wollastonite, calcium carbonate, modified calcium carbonate, coated calcium carbonate, glass fibres, bamboo fibres, flax fibres, hemp fibres, and any mixture thereof.

Examples of talc that can be used according to the present disclosure are talc filler Finntalc MO5SL and Finntalc M15, both manufactured and sold by Mondo Minerals (CAS-No. 14807-96-6. Finntalc MO5SL has a median particle size (d50) of 2.2 μm. Finntalc M15 has a median particle size (d50) of 4.5 μm.

The composite material, according to the disclosure, may contain additives such as, by way of example, antioxidants, light stabilizers, acid scavengers, flame retardants, lubricants, antistatic additives, nucleating/clarifying agents, colourants.

The antioxidants used in the composite material of the present disclosure, preferably, have anti-gas fading properties. The preferred antioxidants are selected from the group consisting of phosphites, hindered phenols, hindered amine stabilizers and hydroxylamines. An example, of a suitable antioxidant additivation is a blend of Irgafos 168 and Irganox 3114. Alternatively, phenol-free antioxidant additivatives are suitable as well, such as for example, those based on hindered amine stabilizers, phosphites, hydroxylamines or any combination of these. In general, the antioxidants are added to the propylene homopolymer in an amount from 100 ppm to 2000 ppm with the exact amount depending upon the nature of the antioxidant, the processing conditions and other factors.

In order to produce the composite material, the first polymer is blended with the carbon particles and the optional one or more fillers and/or one or more additives. The carbon particles can be blended directly with the first polymer or provided by means of a masterbatch, wherein the masterbatch comprises the blend of the carbon particles with a second polymer.

When the carbon particles are provided in a form of a masterbatch, said masterbatch will preferably show a content of carbon particles in a content ranging from 4.0 wt. % to 30.0 wt. % as determined according to ISO 11358:2014 and based on the total weight of said masterbatch; and a second polymer which is one or more semi-crystalline polymers selected from polyethylene and/or polypropylene, or one or more amorphous polymers; provided that the second polymer is of the same nature than the first polymer. Therefore, in case the first polymer is polypropylene, the second polymer will be polypropylene. In case the first polymer is polyethylene, the second polymer will be polyethylene. In case the first polymer is polystyrene, the second polymer will be polystyrene.

For example, the second polymer is present in the composite material at a content ranging from 5 to 90 wt. % based on the total weight of the composite material, for example, from 10 to 80 wt. %; for example, from 15 to 70 wt. %; for example, from 20 to 60 wt. %.

For example, the second polymer is selected from a virgin polymer resin, a polymer post-consumer resin, and a blend of a virgin polymer resin and a post-consumer polymer resin.

For example, the second polymer comprises from 5 to 100 wt. % of post-consumer polymer resin based on the total weight of the second polymer; for example, from 20 to 95 wt. %; for example, from 40 to 90 wt. %, for example, from 50 to 85 wt. %; for example, from 60 to 80 wt. %.

When the first polymer and/or the second polymer when present is or comprises a post-consumer resin and the composite material comprises from 5 to 98 wt. % of polymer post-consumer resin based on the total weight of the composite material; The person skilled in the art will have advantage to perform at least one heating step in order to reduce the content of volatile organic compounds (VOC). The heating step comprises heating the electrical heating panel and/or the device comprising the composite material for a time of at least 1 min at a temperature ranging:

from Tm−70° C. to Tm−20° C. when the first polymer one or more semi-crystalline polymers selected from polyethylene and/or polypropylene, wherein Tm is the melting temperature of the first polymer or the melting temperature of the second polymer when present, provided that the melting temperature of the second polymer is lower than the one of the first polymer; with preference, from Tm−50° C. to Tm−30° C.; or from Tg−50° C. to Tg−10° C. when the first polymer is one or more amorphous polymers wherein Tg is the glass transition temperature of the first polymer or the glass transition temperature of the second polymer when present provided that the glass transition temperature of the second polymer is lower than the one of the first polymer; with preference, from Tg−40° C. to Tg−20° C.

With preference the time of heating is ranging from 1 min to 1 hour, preferably from 2 min to 45 min, more preferably from 3 min to 30 min; and even more preferably from 4 min to 25 min or from 5 min to 20 min.

Therefore, in one or more embodiment, the use is conducted for a time sufficient to result in the odour being improved as measured through the short-chain content (volatiles) by a thermodesorption analysis (TDA) coupled with a chromatography analysis. Indeed, it was found that the VOC when having short chain of $C_{12}$ or less produce an odour that may be unpleasant for the passenger of a motor vehicle.

The one or more heating steps allow a reduction of the VOC so that the content of the VOC after the heating step is reduced compared to the content of the VOC before the heating step. The higher is the temperature of heating, the lower is the heating time needed to achieve a reduction of the VOC content.

The heating step comprises heating the electrical heating panel and/or the device comprising the composite material comprising post-consumer resin(s) in an oven or by the application of a given voltage that is preferably higher than 48 V.

Since the use of one or more heating step allows reducing the content of volatile organic compounds (VOC) it allows the use of one or more post-consumer resins in an electrical heating panel intended to be placed in a motor vehicle, and in particular in the passenger compartment of said motor vehicle. With preference, the motor vehicle is selected from a car, a bus or a truck.

Selection of the First Polymer, and Optional Second Polymer, to be Polypropylene In one or more embodiments, the first polymer is semi-crystalline and is or comprises a first polypropylene resin. When present, the second polymer is semi-crystalline and is or comprises a second polypropylene resin.

In an example, the carbon particles are provided in the form of a masterbatch comprising a blend of a second polypropylene resin and the carbon particles. The second polypropylene resin of the masterbatch can be the same that the first polypropylene resin. However, in a preferred example, the second polypropylene resin of the masterbatch is different from the first polypropylene resin.

For example, the first polypropylene resin and/or the second polypropylene resin is selected from an isotactic polypropylene resin and a syndiotactic polypropylene resin; with preference, the first polypropylene resin and/or the second polypropylene resin is an isotactic polypropylene resin.

When the polypropylene resin disclosure is isotactic, it is characterized by an isotacticity for which the content of mmmm pentads is measured. Preferably, the content of mmmm pentads polypropylene has a content of mmmm pentads of at least 90% as determined by $^{13}$C-NMR analysis, preferably at least 95% more preferably at least 98% and even more preferably of at least 99%.

The isotacticity may be determined by $^{13}$C-NMR analysis as described in the test methods. Bovey's NMR nomenclature for an isotactic pentad is . . . mmmm . . . with each "m" representing a "meso" dyad or successive methyl groups on the same side in the plane. As known in the art, any deviation or inversion in the structure of the chain lowers the degree of isotacticity and crystallinity of the polymer.

For example, the first polypropylene resin and/or the second polypropylene resin is selected from a virgin polypropylene resin, a polypropylene post-consumer resin and a blend of a virgin polypropylene resin and a polypropylene post-consumer resin.

The first polypropylene resin and/or the second polypropylene resin is preferably selected from a propylene homopolymer, a copolymer of propylene with one or more comonomers selected from ethylene and $C_4$-$C_{20}$ alpha-olefins, an heterophasic polypropylene and any mixture thereof.

In an example, of the disclosure, the first polypropylene resin and/or the second polypropylene resin is a homopolymer of propylene. A propylene homopolymer according to this disclosure has less than 0.2 wt. %, preferably, less than 0.1 wt. %, more preferably, less than 0.05 wt. % and most preferably, less than 0.005 wt. %, of alpha-olefins other than propylene in the polymer. Most preferred, no other alpha-olefins are detectable. Accordingly, when the polypropylene resin is a homopolymer of propylene, the comonomer content in the polypropylene is less than 0.2 wt. %, more preferably, less than 0.1 wt. %, even more preferably, less than 0.05 wt. % and most preferably, less than 0.005 wt. % based on the total weight of the polypropylene.

The first polypropylene resin and/or the second polypropylene resin may be a copolymer of propylene and at least one comonomer, or a mixture thereof. Suitable comonomers can be selected from the group consisting of ethylene and aliphatic $C_4$-$C_{20}$ alpha-olefins. Examples of suitable aliphatic $C_4$-$C_{20}$ alpha-olefins include 1-butene, 1-pentene, 4-methyl-1-pentene, 1-hexene, 1-octene, 1-decene, 1-dodecene, 1-tetradecene, 1-hexadecene, 1-octadecene and 1-eicosene. Preferably, the comonomer is ethylene or 1-hexene. More preferably, the comonomer is ethylene.

In an example, the first polypropylene resin and/or the second polypropylene resin is a propylene copolymer. The propylene copolymer can be a random copolymer, a heterophasic copolymer, or a mixture thereof.

The random propylene copolymer comprises at least 0.1 wt. % of one or more comonomers, preferably at least 1 wt. %. The random propylene copolymer comprises up to 10 wt. % of one or more comonomers and most preferably up to 6 wt. %. Preferably, the random copolymer is a copolymer of propylene and ethylene.

In a preferred example, the first polypropylene resin is a heterophasic propylene copolymer resin. The heterophasic propylene copolymers comprise a matrix propylene polymer phase and a dispersed phase of a rubber. With preference, the rubber is ethylene-propylene rubber (EPR).

The heterophasic propylene copolymers of the present disclosure as defined above can be produced by sequential polymerization in a series of polymerization reactors in presence of a catalyst system, wherein in a first polymerization stage the propylene polymer is produced, and in a second polymerization stage the rubber is produced by copolymerizing ethylene and at least one further olefin different from ethylene. The catalyst system is added to the first polymerization stage.

Thus, with preference, the first polypropylene resin and/or the second polypropylene resin is an heterophasic polypropylene resin consisting of:
  i. from 60 to 95 wt. % based on the total weight of the heterophasic polypropylene resin of a polypropylene-based matrix selected from a homopolymer and/or a copolymer of propylene with one or more comonomers selected from ethylene and $C_4$-$C_{20}$ alpha-olefins, and ii. from 40 to 5 wt. % based on the total weight of the heterophasic polypropylene resin of a dispersed ethylene-alpha-olefin copolymer;

with preference, the alpha-olefin in the ethylene-alpha-olefin copolymer is selected from the group of alpha-olefins having from 3 to 8 carbon atoms and/or the alpha-olefin in the ethylene-alpha-olefin copolymer is in the range of 25 to 70 wt. % based on the total weight of the ethylene-alpha-olefin copolymer.

The first polypropylene resin is present in the composite material at a content ranging from 5 to 98 wt. % based on the total weight of the composite material; for example, from 10 to 96 wt. %; for example, from 20 to 95 wt. %; for example, from 30 to 94 wt. %; for example, from 40 to 93 wt. %.

When present, the second polypropylene resin is present in the composite material in a content ranging from 5 to 90 wt. % based on the total weight of the composite material, for example, from 10 to 80 wt. %; for example, from 15 to 70 wt. %; for example, from 20 to 60 wt. %.

The first polypropylene resin has a melt index MI2 ranging from 4 to 260 g/10 min as determined according to ISO 1133 at 230° C. under a load of 2.16 kg; for example, from 5 to 200 g/10 min; for example, from 6 to 180 g/10 min; for example, from 7 to 160 g/10 min, for example, from 8 to 80 g/10 min.

For example, the first polypropylene resin has a melt index MI2 of at least 4 g/10 min, preferably of at least 5 g/10 min, more preferably of at least 6 g/10 min, even more preferably of at least 7 g/10 min, most preferably of at least 10 g/10 min, and even most preferably of at least 14 g/10 min as measured according to ISO 1133 at 230° C. under a load of 2.16 kg. The value of MI2 of the first polypropylene resin is obtained without a degradation treatment.

More preferably, the first polypropylene resin has a melt index MI2 of at most 260 g/10 min, preferably of at most 200 g/10 min, more preferably of at most 180 g/10 min, and most preferably of at most 160 g/10 min as measured according to ISO 1133 at 230° C. under a load of 2.16 kg. The value of MI2 of the first polypropylene resin is obtained without a degradation treatment.

When the composite material is produced by the direct blend of the carbon particles with the first polymer, the first polypropylene resin is preferably selected to have a melt index MI2 ranging from 80 to 260 g/10 min as determined according to ISO 1133 at 230° C. under a load of 2.16 kg; for example, from 90 to 200 g/10 min; for example, from 100 to 180 g/10 min; for example, from 120 to 160 g/10 min.

When the carbon particles are provided in a form of a masterbatch; first polypropylene resin has a melt index MI2 ranging from 4 to 260 g/10 min as determined according to ISO 1133 at 230° C. under a load of 2.16 kg; for example, from 5 to 200 g/10 min; for example, from 6 to 180 g/10 min; for example, from 7 to 160 g/10 min, for example, from 8 to 80 g/10 min In a preferred embodiment, the carbon particles are provided in a form of a masterbatch; and the first polypropylene resin has a melt index MI2 ranging from 4 to 80 g/10 min as determined according to ISO 1133 at 230° C. under a load of 2.16 kg; for example, from 5 to 50 g/10 min; for example, from 6 to 40 g/10 min; for example, from 7 to 30 g/10 min; for example, from 8 to 25 g/10 min.

For example, the second polypropylene resin has a melt index MI2 ranging from 80 to 260 g/10 min as determined according to ISO 1133 at 230° C. under a load of 2.16 kg; for example, from 90 to 200 g/10 min; for example, from 100 to 180 g/10 min; for example, from 120 to 160 g/10 min.

More preferably, the second polypropylene resin has a melt index MI2 of at least 90 g/10 min, preferably of at least 95 g/10 min, more preferably of at least 100 g/10 min, even more preferably of at least 105 g/10 min, most preferably of at least 110 g/10 min, and even most preferably of at least 120 g/10 min as measured according to ISO 1133 at 230° C. under a load of 2.16 kg. The value of MI2 of the second polypropylene resin is obtained without a degradation treatment.

Preferably, the second polypropylene resin has a melting temperature Tm comprised between 130° C. and 170° C., as measured according to ISO 3146, more preferably, of at least 150° C.

More preferably, the second polypropylene resin has a melt index MI2 of at most 260 or of at most 200 g/10 min, preferably of at most 180 g/10 min, more preferably of at most 170 g/10 min, and most preferably of at most 160 g/10 min as measured according to ISO 1133 at 230° C. under a load of 2.16 kg. The value of MI2 of the polypropylene resin is obtained without a degradation treatment.

With preference, the masterbatch comprises the blend of a second polypropylene resin and carbon particles, wherein the carbon particles are in a content ranging from 4.0 wt. % to 30.0 wt. % as determined according to ISO 11358:2014 and based on the total weight of said masterbatch.

Thus in an example, the carbon particles-masterbatch comprises a blend of:
from 96.0 to 70.0 wt. % of a second polypropylene resin based on the total weight of said masterbatch; wherein the second polypropylene resin has an MI2 ranging from 80 to 260 g/10 min as determined according to ISO 1133 at 230° C. under a load of 2.16 kg;
4.0 wt. % to 30.0 wt. % of carbon particles as determined according to ISO 11358:2014 and based on the total weight of the said masterbatch.

The masterbatch according to the disclosure comprises a polypropylene and carbon particles. According to a preferred example, the carbon particles are present in an amount from 5.0 to 25.0 wt. % as based on the total weight of the masterbatch, preferably from 7.5 to 20 wt. %, and more preferably between 9.0 to 15.0 wt. %.

The CNT-PP masterbatch is produced by blending together a second polypropylene resin having a melting temperature Tm as measured according to ISO 3146, carbon nanotubes, and optional processing aids, in an extruder comprising a transport zone and a melting zone, maintained at a temperature comprised between Tm+1° C. and Tm+50° C., preferably, comprised between Tm+5° C. and Tm+30° C.

In an example, the process for the preparation of the masterbatch according to the present disclosure comprises the steps of:
i. providing carbon nanotubes,
ii. providing a second polypropylene resin having a melting temperature, Tm, measured according to ISO 3146, and wherein said second polypropylene resin has a melt index MI2 ranging from 80 to 250 g/10 min as determined according to ISO 1133 at 230° C. under a load of 2.16 kg,
iii. blending together said carbon nanotubes and said second polypropylene resin by extrusion in an extruder comprising a transport zone and a melting zone maintained at a temperature comprised between Tm+1° C. and Tm+50° C., preferably, between Tm+5° C. and Tm+30° C., and
iv. forming a masterbatch through a die, said masterbatch comprising at least 4.0 wt. % of carbon nanotubes based on the total weight of the masterbatch as determined according to ISO 11358:2014.

In a preferred example, the process further comprises the step of blending from 0.01 to 4.0 wt. %, preferably, from 0.1 to 2.0 wt. % of one or more processing aids based on the total weight of the masterbatch, with the second polypropylene resin and the carbon nanotubes in step iii).

Therefore, in an example, the masterbatch further comprises from 0.01 to 4.0 wt. % of a processing aid as based on the total weight of the masterbatch, said processing aid is selected from fluoroelastomers, waxes, tristearin, erucyl amide, oleic acid amide, ethylene-acrylic acid copolymer, ethylene-vinyl acetate copolymer, cetyl trimethyl ammonium bromide, polysiloxanes, oleamide, stearamide, behenamide, cetyl palmitamide, ethylene bis-oleamide, ethylene bis(stearamide) (EBS) and any mixture thereof.

In a preferred example, step iii) is carried out on co-rotating twin-screw extruder at a screw speed of at least 300 rpm, preferably, at least 500 rpm.

The first polypropylene resin and/or second polypropylene resin has a monomodal molecular weight distribution or a multimodal molecular weight distribution, for example, a bimodal molecular weight distribution.

The first polypropylene resin and/or second polypropylene resin can be produced by polymerizing propylene and one or more optional comonomers, in the presence of a catalyst being a metallocene catalyst or a Ziegler-Natta catalyst.

In a preferred example, the catalyst system may comprise a Ziegler-Natta catalyst. The term "Ziegler-Natta catalysts" refers to catalysts of the general formula MXn, wherein M is a transition metal compound selected from group IV to VII, wherein X is a halogen, and wherein n is the valence of the metal. Preferably, the metal is titanium, chromium or vanadium. Most preferably, the metal is titanium.

The Ziegler-Natta catalyst system, in accordance with the disclosure, comprises a titanium compound having at least one titanium-halogen bond and an internal electron donor, both on a suitable support, an organoaluminium compound, and an optional external electron donor. A suitable support is, for example, a magnesium halide in an active form. A suitable external electron donor (ED) is, for example, phthalate or succinate or a diether compound. The organoaluminium compound used in the process of the present disclosure is triethyl aluminium (TEAL).

Advantageously, the triethyl aluminium has a hydride content, expressed as $AlH_3$, of less than 1.0 wt. % with respect to the triethyl aluminium. More preferably, the hydride content is less than 0.5 wt. %, and most preferably, the hydride content is less than 0.1 wt. %. It would not depart from the scope of the disclosure if the organoaluminium compound contains minor amounts of other compounds of the trialkyl aluminium family, such as triisobutyl aluminium, tri-n-butyl aluminium, and linear or cyclic alkyl aluminium compounds containing two or more Al atoms, provided they show polymerization behaviour comparable to that of TEAL.

In the process of the present disclosure, the molar ratio Al/Ti is not particularly specified. However, it is preferred that the molar ratio Al/Ti is at most 100.

If an external electron donor is present, it is preferred that the molar ratio Al/ED, with ED denoting external electron donor, is at most 120, more preferably, it is within the range of 5 to 120, and most preferably, within the range of 10 to 80. Before being fed to the polymerization reactor, the catalytic system preferably undergoes a premix and/or a pre-polymerization step.

In the premix step, the triethyl aluminium (TEAL) and the external electron donor (ED)—if present—, which have been pre-contacted, are mixed with the Ziegler-Natta catalyst at a temperature within the range of 0° C. to 30° C., preferably, within the range of 5° C. to 20° C., for up to 15 min. The mixture of TEAL, an external electron donor (if present) and Ziegler-Natta catalyst is pre-polymerized with propylene at a temperature within the range of 10° C. to 100° C., preferably, within the range of 10° C. to 30° C., for 1 to 30 min, preferably, for 2 to 20 min.

In the first stage, the polymerization of propylene and one or more optional comonomers can, for example, be carried out in liquid propylene as reaction medium (bulk polymerization). It can also be carried out in diluents, such as hydrocarbon that is inert under polymerization conditions (slurry polymerization). It can also be carried out in the gas phase. Those processes are well known to one skilled in the art.

Diluents, which are suitable for being used in accordance with the present disclosure, may comprise but are not limited to hydrocarbon diluents such as aliphatic, cycloaliphatic and aromatic hydrocarbon solvents, or halogenated versions of such solvents. Non-limiting illustrative examples of solvents are butane, isobutane, pentane, hexane, heptane, cyclopentane, cyclohexane, cycloheptane, methyl cyclopentane, methyl cyclohexane, isooctane, benzene, toluene, xylene, chloroform, chlorobenzenes, tetrachloroethylene, dichloroethane and trichloroethane.

For the present disclosure, the propylene polymers are preferably produced by polymerization in liquid propylene at temperatures within the range of 20° C. to 100° C. Preferably, temperatures are within the range of 60° C. to 80° C. The pressure can be atmospheric or higher. Preferably, the pressure is ranging between 25 and 50 bars.

Hydrogen is used to control the chain lengths of the propylene polymers. For the production of a propylene polymer with higher MI2, i.e., with lower average molecular weight and shorter polymer chains, the concentration of hydrogen in the polymerization medium needs to be increased. Inversely, the hydrogen concentration in the polymerization medium has to be reduced in order to produce a propylene polymer with lower MI2, i.e., with higher average molecular weight and longer polymer chains.

In such a sequential arrangement of polymerization reactors, the propylene homopolymer withdrawn from one reactor is transferred to the one following in the series, where the polymerization is continued. To produce propylene homopolymer fractions of different melt indexes, the polymerization conditions in the respective polymerization reactors need to be different, for example, in that the hydrogen concentration in the polymerization reactors differs.

The melt index MI2 of the propylene polymer produced in the second reactor is calculated using the following equation (2):

$$\text{Log}(MI2_{final}) = w_{B1} \times (\text{Log } MI2_{B1}) + w_{B2} \times \text{Log}(MI2_{B2}) \quad (2)$$

wherein $MI2_{final}$ is the melt index MI2 of the total propylene polymer produced, $MI2_{B1}$ and $MI2_{B2}$ are the respective a melt index MI2 of the propylene polymers fractions produced in the first and the second polymerization loop reactors, and $w_{B1}$ and $w_{B2}$ are the respective weight fractions of the propylene polymers produced in the first and in the second polymerization loop reactors as expressed in weight percent (wt. %) of the total propylene polymer produced in the two polymerization loop reactors. These weight fractions are also commonly described as the contribution by the respective loop.

The matrix propylene polymer, preferably, propylene homopolymer, can be made for example, in loop reactors or in a gas phase reactor. The propylene polymer produced in this way, in a first polymerization stage, is transferred to a second polymerization stage, into one or more secondary reactors where ethylene and at least one further olefin different from ethylene are added to produce the rubber. For example, further olefin is propylene. Thus, the rubber produced is ethylene-propylene rubber (EPR). Preferably, this polymerization step is done in a gas phase reactor. The propylene copolymer can be prepared using a controlled morphology catalyst that produces rubber spherical domains dispersed in a polypropylene matrix. The amount and properties of the components are controlled by the process conditions.

The average molecular weight of the rubber, for which the intrinsic viscosity is a measure, is controlled by the addition of hydrogen to the polymerization reactors of the second polymerization stage. The amount of hydrogen added is such that the rubber as an intrinsic viscosity 2.0 dl/g, and of at most 5.5 dl/g, measured in tetralin at 135° C. following ISO 1628. The contribution of the second polymerization stage, i.e., the rubber content of the heterophasic propylene copolymer is from 5 to 50 wt. % relative to the total weight of the heterophasic propylene copolymer.

After the last polymerization reactor, the polymers are recovered as a powder and can then be pelletized or granulated.

Polypropylene resins suitable for the disclosure as first polypropylene resin or second polypropylene resins are commercially available from Total®. A non-limitative example, is TOTAL® PPC7760 with a melt index MI2 of 15.0 g/10 min as measured according to ISO 1133 at 230° C. under a load of 2.16 kg. Another example, is PPC 6742 with a melt index MI2 of 8 g/10 min as determined according to ISO 1133 at 230° C. under a load of 2.16 kg. Another example, is MH140CN0, with a melt index MI2 of 140 g/10 min as determined according to ISO 1133 at 230° C. under a load of 2.16 kg.

The first polypropylene resin and/or the second polypropylene resin may comprise one or more polypropylene post-consumer resins; for example, the first polypropylene resin and/or the second polypropylene resin comprises from 5 to 100 wt. % of polypropylene post-consumer resin based on the total weight of the polypropylene resin; for example, from 20 to 95 wt. %; for example, from 40 to 90 wt. %, for example, from 50 to 85 wt. %; for example, from 60 to 80 wt. %.

An example, of a commercially available polypropylene post-consumer resin (PCR-PP), that can be used according to the disclosure, is PP Regranulat 500-S or PP Regranulat 530-S both marketed by Vogt Plastic GmbH.

The polypropylene post-consumer resin (PCR-PP) that can be used in accordance with the disclosure is preferably originated from a specific collection of domestic or household waste, and/or from the end of life vehicles (ELV) waste.

When the first polypropylene resin and/or second polypropylene resin is or comprises a post-consumer resin; the MI2 of the polypropylene post-consumer resin can be selected in the same manner than for the virgin resin. For example, the first polypropylene resin and/or second polypropylene resin is or comprises a post-consumer resin having an MI2 ranging from 4 to 260 g/10 min as determined according to ISO 1133 at 230° C. under a load of 2.16 kg; for example, from 5 to 200 g/10 min; for example, from 6 to 180 g/10 min; for example, from 7 to 160 g/10 min, for example, from 8 to 80 g/10 min.

For example, the first polypropylene resin and/or the second polypropylene resin is or comprises a post-consumer resin; and the polypropylene post-consumer resin has an MI2 ranging from 80 to 260 g/10 min as determined according to ISO 1133 at 230° C. under a load of 2.16 kg; for example, from 90 to 200 g/10 min; for example, from 100 to 180 g/10 min; for example, from 120 to 160 g/10 min.

For example, the first polypropylene resin and/or the second polypropylene resin is or comprises a post-consumer resin; wherein the polypropylene post-consumer resin is a blend of recycled polypropylene and recycled polyethylene, wherein the content of the recycled polyethylene is ranging from 3 to 25 wt. % relative to the total weight of the polypropylene post-consumer resin. In a preferred embodiment, the post-consumer resin comprises less than 10 wt. % based on the total weight of the recycled resin of polymers other than polypropylene. For example, the post-consumer resin may contain up to 10 wt. % of polyethylene based on the total weight of the post-consumer resin; for example, from 3 to 10 wt. %.

Selection of the First Polymer, and Optional Second Polymer, to be Polyethylene

In one or more embodiments, the first polymer is semi-crystalline and is or comprises a first polyethylene resin. When present, the second polymer is semi-crystalline and is or comprises a second polyethylene resin.

In an example, the carbon particles are provided in the form of a masterbatch comprising a blend of a second polyethylene resin and the carbon particles. The second polyethylene resin of the masterbatch can be the same that the first polyethylene resin. However, in a preferred example, the second polyethylene resin of the masterbatch is different from the first polyethylene resin.

For example, the first polyethylene resin and/or the second polyethylene resin is selected from a virgin polyethylene resin, a polyethylene post-consumer resin and a blend of a virgin polyethylene resin and a polyethylene post-consumer resin.

The first polyethylene resin and/or the second polyethylene resin is preferably selected from an ethylene homopolymer, a copolymer of ethylene with one or more comonomers selected from $C_3$-$C_{20}$ alpha-olefins and any mixture thereof.

In an example, of the disclosure, the first polyethylene resin and/or the second polyethylene resin is a homopolymer of ethylene. An ethylene homopolymer according to this disclosure has less than 0.2 wt. %, preferably, less than 0.1 wt. %, more preferably, less than 0.05 wt. % and most preferably, less than 0.005 wt. %, of alpha-olefins other than ethylene in the polymer. Most preferred, no other alpha-olefins are detectable. Accordingly, when the polyethylene resin is a homopolymer of ethylene, the comonomer content in the polyethylene is less than 0.2 wt. %, more preferably, less than 0.1 wt. %, even more preferably, less than 0.05 wt. % and most preferably, less than 0.005 wt. % based on the total weight of the polyethylene.

The first polyethylene resin and/or the second polyethylene resin may be a copolymer of ethylene and at least one comonomer, or a mixture thereof. Suitable comonomers can be selected from the group consisting of aliphatic $C_3$-$C_{20}$ alpha-olefins. Examples of suitable aliphatic $C_3$-$C_{20}$ alpha-olefins include propylene, 1-butene, 1-pentene, 4-methyl-1-pentene, 1-hexene, 1-octene, 1-decene, 1-dodecene, 1-tetradecene, 1-hexadecene, 1-octadecene and 1-eicosene. Preferably, the comonomer is propylene or 1-hexene. More preferably, the comonomer is propylene.

In an example, the first polyethylene resin and/or the second polyethylene resin is an ethylene copolymer. The ethylene copolymer comprises at least 0.1 wt. % of one or more comonomers, preferably at least 1 wt. %. The ethylene copolymer comprises up to 10 wt. % of one or more comonomers and most preferably up to 6 wt. %. Preferably, the ethylene copolymer is a copolymer of propylene and ethylene.

The density of the first polyethylene resin and/or the second polyethylene resin ranges from 0.820 g/cm$^3$ to 0.980 g/cm$^3$. Preferably, the first polyethylene resin and/or the second polyethylene resin has a density of at most 0.960 g/cm$^3$, or of at most 0.940 g/cm$^3$ or of at most 0.939 g/cm$^3$ or of at most 0.936 g/cm$^3$. Preferably, the first polyethylene resin and/or the second polyethylene resin has a density of at least 0.850 g/cm$^3$, more preferably of at least 0.900 g/cm$^3$, even more preferably of at least 0.910 g/cm$^3$ and most preferably of at least 0.915 g/cm$^3$. The density is determined according to ISO 1183 at a temperature of 23° C. The first polyethylene resin and/or the second polyethylene resin comprises linear low-density polyethylene (LLDPE), low-density polyethylene (LDPE), medium-density polyethylene (MDPE), high-density polyethylene (HDPE), and mixtures thereof. With preference, the first polyethylene resin and/or the second polyethylene resin comprises linear low-density polyethylene (LLDPE), low-density polyethylene (LDPE), medium-density polyethylene (MDPE) and mixtures thereof. For example, the first polyethylene resin and/or the second polyethylene resin is or comprises medium-density polyethylene (MDPE).

High-density polyethylene (HDPE) is defined to have a density of at least 0.940 g/cm$^3$. Medium-density polyethylene (MDPE) has a density ranging from 0.926-0.940 g/cm$^3$. Low-density polyethylene (LDPE) has a density ranging from 0.917-0.930 g/cm$^3$. Linear low-density polyethylene (LLDPE) has a density ranging from 0.910-0.940 g/cm$^3$.

The first polyethylene resin is present in the composite material at a content ranging from 5 to 98 wt. % based on the total weight of the composite material; for example, from 10 to 96 wt. %; for example, from 20 to 95 wt. %; for example, from 30 to 94 wt. %; for example, from 40 to 93 wt. %.

When present, the second polyethylene resin is present in the composite material in a content ranging from 5 to 90 wt. % based on the total weight of the composite material, for example, from 10 to 80 wt. %; for example, from 15 to 70 wt. %; for example, from 20 to 60 wt. %.

The first polyethylene resin has a melt index MI2 ranging from 0.1 to 100 g/10 min as determined according to ISO 1133 at 190° C. under a load of 2.16 kg; for example, from 0.5 to 80 g/10 min; for example, from 1 to 50 g/10 min; for example, from 2 to 40 g/10 min, for example, from 3 to 30 g/10 min; for example, from 4 to 25 g/10 min; for example, from 5 to 20 g/10 min; for example, from 4 to 18 g/10 min; for example, from 0.1 to 20 g/10 min.

For example, the first polyethylene resin has a melt index MI2 of at least 0.1 g/10 min, preferably of at least 0.5 g/10 min, more preferably of at least 1 g/10 min, even more preferably of at least 2 g/10 min, most preferably of at least 3 g/10 min, and even most preferably of at least 4 g/10 min or of at least 5 g/10 min as measured according to ISO 1133 at 190° C. under a load of 2.16 kg. The value of MI2 of the first polyethylene is obtained without a degradation treatment.

More preferably, the first polyethylene resin has a melt index MI2 of at most 100 g/10 min, preferably of at most 80 g/10 min, more preferably of at most 50 g/10 min, even more preferably of at most 40 g/10 min; most preferably of at most 30 g/10 min, even most preferably of at most 25 g/10 min or of at most 20 g/10 min or of at most 18 g/10 min or of at most 15 g/10 min or of at most 10 g/10 min as measured according to ISO 1133 at 190° C. under a load of 2.16 kg. The value of MI2 of the first polyethylene resin is obtained without a degradation treatment.

When the composite material is produced by the direct blend of the carbon particles with the first polymer, the first polyethylene resin is preferably selected to have a melt index MI2 ranging from 4 to 100 g/10 min as determined according to ISO 1133 at 190° C. under a load of 2.16 kg; for example, from 5 to 80 g/10 min; for example, from 6 to 50 g/10 min; for example, from 4 to 18 g/10 min; for example, from 5 to 20 g/10 min.

When the carbon particles are provided in a form of a masterbatch; the first polyethylene resin has a melt index MI2 ranging from 0.1 to 100 g/10 min as determined according to ISO 1133 at 190° C. under a load of 2.16 kg; for example, from 0.5 to 80 g/10 min; for example, from 1 to 50 g/10 min; for example, from 2 to 40 g/10 min, for example, from 3 to 30 g/10 min; for example, from 4 to 25 g/10 min; for example, from 5 to 20 g/10 min. In a preferred embodiment, the carbon particles are provided in a form of a masterbatch; and the first polyethylene resin has a melt index MI2 ranging from 0.1 to 20 g/10 min as determined according to ISO 1133 at 190° C. under a load of 2.16 kg; for example, from 0.5 to 15 g/10 min; for example, from 0.8 to 10 g/10 min; for example, from 1 to 9 g/10 min; for example, from 2 to 8 g/10 min.

For example, the second polyethylene resin has a melt index MI2 ranging from 4 to 100 g/10 min as determined according to ISO 1133 at 190° C. under a load of 2.16 kg; for example, from 5 to 80 g/10 min; for example, from 6 to 50 g/10 min; for example, from 5 to 20 g/10 min; for example, from 4 to 18 g/10 min; for example, from 4 to 9 g/10 min.

More preferably, the second polyethylene resin has a melt index MI2 of at least 4.0 g/10 min, preferably of at least 4.5 g/10 min, more preferably of at least 5.0 g/10 min, even more preferably of at least 5.5 g/10 min, and most preferably of at least 6.0 g/10 min as measured according to ISO 1133 at 190° C. under a load of 2.16 kg. The value of MI2 of the second polyethylene resin is obtained without a degradation treatment.

More preferably, the second polyethylene resin has a melt index MI2 of at most 100.0 g/10 min, preferably of at most 80.0 g/10 min, more preferably of at most 50.0 g/10 min, and most preferably of at most 40.0 g/10 min or of at most 30.0 g/10 min or of at most 25.0 g/10 min or of at most 20.0 g/10 min or of at most 18.0 g/10 min or of at most 15.0 g/10 min or of at most 10.0 g/10 min or of at most 9.0 g/10 min as measured according to ISO 1133 at 190° C. under a load of 2.16 kg. The value of MI2 of the polyethylene resin is obtained without a degradation treatment.

Preferably, the second polyethylene resin has a melting temperature Tm comprised between 110° C. and 140° C., as measured according to ISO 3146, more preferably, of at least 115° C.

With preference, the masterbatch comprises the blend of a second polyethylene resin and carbon particles, wherein the carbon particles are in a content ranging from 4.0 wt. % to 30.0 wt. % as determined according to ISO 11358:2014 and based on the total weight of said masterbatch.

Thus in an example, the carbon particles-masterbatch comprises a blend of:

from 96.0 to 70.0 wt. % of a second polyethylene resin based on the total weight of said masterbatch; wherein the second polyethylene resin has an MI2 ranging from 10 to 250 g/10 min as determined according to ISO 1133 at 190° C. under a load of 2.16 kg;

4.0 wt. % to 30.0 wt. % of carbon particles as determined according to ISO 11358:2014 and based on the total weight of the said masterbatch.

The masterbatch according to the disclosure comprises a polyethylene and carbon particles. According to a preferred example, the carbon particles are present in an amount from 5.0 to 25.0 wt. % as based on the total weight of the masterbatch, preferably from 7.5 to 20 wt. %, and more preferably between 9.0 to 15.0 wt. %.

The CNT-PE masterbatch is produced by blending together a second polyethylene resin having a melting temperature Tm as measured according to ISO 3146, carbon nanotubes, and optional processing aids, in an extruder comprising a transport zone and a melting zone maintained at a temperature comprised between Tm+1° C. and Tm+50° C., preferably, comprised between Tm+5° C. and Tm+30° C.

In an example, the process for the preparation of the masterbatch according to the present disclosure comprises the steps of:
i. providing carbon nanotubes,
ii. providing a second polyethylene resin having a melting temperature, Tm, measured according to ISO 3146, and wherein said second polyethylene resin has a melt index MI2 ranging from 4 to 100 g/10 min as determined according to ISO 1133 at 190° C. under a load of 2.16 kg,
iii. blending together said carbon nanotubes and said second polyethylene resin by extrusion in an extruder comprising a transport zone and a melting zone maintained at a temperature comprised between Tm+1° C. and Tm+50° C., preferably, between Tm+5° C. and Tm+30° C., and
iv. forming a masterbatch through a die, said masterbatch comprising at least 4.0 wt. % of carbon nanotubes based on the total weight of the masterbatch as determined according to ISO 11358:2014.

In a preferred example, the process further comprises the step of blending from 0.01 to 4.0 wt. %, preferably, from 0.1 to 2.0 wt. % of one or more processing aids based on the total weight of the masterbatch, with the second polyethylene resin and the carbon nanotubes in step iii).

Therefore, in an example, the masterbatch further comprises from 0.01 to 4.0 wt. % of a processing aid as based on the total weight of the masterbatch, said processing aid is selected from fluoroelastomers, waxes, tristearin, erucyl amide, oleic acid amide, ethylene-acrylic acid copolymer, ethylene-vinyl acetate copolymer, cetyl trimethyl ammonium bromide, polysiloxanes, oleamide, stearamide, behenamide, cetyl palmitamide, ethylene bis-oleamide, ethylene bis(stearamide) (EBS) and any mixture thereof.

In a preferred example, step iii) is carried out on co-rotating twin-screw extruder at a screw speed of at least 300 rpm, preferably, at least 500 rpm.

The first polyethylene resin and/or second polyethylene resin has a monomodal molecular weight distribution or a multimodal molecular weight distribution, for example, a bimodal molecular weight distribution.

The first polyethylene resin and/or second polyethylene resin can be produced by polymerizing propylene and one or more optional comonomers, in the presence of a catalyst being a metallocene catalyst or a Ziegler-Natta catalyst.

Polyethylene resins suitable for the disclosure as first polyethylene resin or second polyethylene resins are commercially available from Total®. HDPE 5502 produced by TOTAL, having an MI2 of 0.25 g/10 min and a density of 0.954 g/cm$^3$. Lumicene Supertough 22ST05 produced by TOTAL, having an MI2 of 0.5 g/10 min and a density of 0.932 g/cm$^3$. FE 8000 produced by TOTAL, having an MI2 of 0.8 g/10 min and a density of 0.924 g/cm$^3$. Lumicene M2710EP produced by TOTAL, having an MI2 of 0.9 g/10 min and a density of 0.927 g/cm$^3$. Q1018N produced by TOTAL, having an MI2 of 1.0 g/10 min and a density of 0.918 g/cm$^3$. M3581UV produced by TOTAL, having an MI2 of 6 g/10 min and a density of 0.935 g/cm$^3$.

The first polyethylene resin and/or the second polyethylene resin may comprise one or more polyethylene post-consumer resins; for example, the first polyethylene resin and/or the second polyethylene resin comprises from 5 to 100 wt. % of polyethylene post-consumer resin based on the total weight of the polyethylene resin; for example, from 20 to 95 wt. %; for example, from 40 to 90 wt. %, for example, from 50 to 85 wt. %; for example, from 60 to 80 wt. %.

An example, of a commercially available stream of polyethylene post-consumer resin (PCR-PE) that can be used according to the disclosure is KWR105M2 marketed by KW Plastics.

The polyethylene post-consumer resin (PCR-PE) that can be used in accordance with the disclosure is preferably selected from HDPE dairy packaging waste.

When the first polyethylene resin and/or second polyethylene resin is or comprises a post-consumer resin; the MI2 of the polyethylene post-consumer resin can be selected in the same manner than for the virgin resin. For example, the first polyethylene resin is or comprises a post-consumer resin having an MI2 ranging from 0.1 to 100 g/10 min as determined according to ISO 1133 at 190° C. under a load of 2.16 kg; for example, from 0.5 to 80 g/10 min; for example, from 1 to 50 g/10 min; for example, from 2 to 40 g/10 min, for example, from 3 to 30 g/10 min; for example, from 4 to 25 g/10 min; for example, from 5 to 20 g/10 min; for example, from 0.1 to 20 g/10 min. For example, the second polyethylene resin is or comprises a post-consumer resin having an MI2 ranging from 4 to 100 g/10 min as determined according to ISO 1133 at 190° C. under a load of 2.16 kg; for example, from 4 to 40 g/10 min; for example, from 4 to 25 g/10 min; for example, from 5 to 20 g/10 min.

For example, the first polyethylene resin and/or the second polyethylene resin is or comprises a post-consumer resin; wherein the post-consumer resin is a blend of recycled polyethylene and recycled polyethylene, wherein the content of the recycled polypropylene is ranging from 3 to 25 wt. % relative to the total weight of the post-consumer resin. In a preferred embodiment, the post-consumer resin comprises less than 10 wt. % based on the total weight of the recycled resin of polymers other than polyethylene. For example, the post-consumer resin may contain up to 10 wt. % of polypropylene based on the total weight of the post-consumer resin; for example, from 3 to 10 wt. %.

Selection of the First Polymer, and Optional Second Polymer, to be an Amorphous Polymer In one or more embodiments, the first polymer is an amorphous polymer; with preference, the first polymer is or comprises a first polystyrene. When present, the second polymer is an amorphous polymer and, with preference is or comprises a second polystyrene.

In an example, the carbon particles are provided in the form of a masterbatch comprising a blend of a second amorphous polymer and the carbon particles. The second amorphous polymer the masterbatch can be the same that the first amorphous polymer. However, in a preferred example, the second amorphous polymer of the masterbatch is different from the first amorphous polymer.

For example, the first amorphous polymer and/or the second amorphous polymer is selected from a virgin amorphous polymer resin, an amorphous polymer post-consumer resin and a blend of a virgin amorphous polymer resin and an amorphous polymer post-consumer resin.

The amorphous polymers considered by the disclosure for the first and second amorphous polymer are selected from polystyrene (PS), acrylonitrile-butadiene-styrene (ABS), polycarbonate (PC), styrene acrylonitrile (SAN), poly(m-ethyl methacrylate) (PMMA), polyvinyl chloride) (PVC), polybutadiene (PBu), polybutylene terephthalate (PBt), poly (p-phenylene oxide) (PPO), polysulfone (PSU), polyethersulfone (PES), polyethylenimine (PEI), polyphenylsulfone (PPSU), acrylonitrile styrene acrylate (ASA) or any combination thereof.

In a preferred embodiment, the second amorphous polymer is polystyrene, modified polystyrene or a mixture of polystyrene and modified polystyrene, with preference the second amorphous polymer is polystyrene, for example, general-purpose polystyrene (GPPS).

In an embodiment, the first and the second amorphous polymers differ from each other by the polymer-type. For example, one amorphous polymer is polystyrene and the other one is acrylonitrile-butadiene-styrene or styrene acrylonitrile. In another example, one amorphous polymer is styrene acrylonitrile and the other one is a mixture of polystyrene and polybutadiene.

In an embodiment, the first and the second amorphous polymers differ from each other by their melt flow index (MFI), the MFI is determined according to ISO 1 133.

The melt flow index MFI of the second amorphous polymer is at least 10 g/10 min as measured at 200° C. under a load of 5 kg according to IS01 133 H, preferably at least 15 g/10 min, preferably at least 18 g/10 min, preferably at least 20 g/10 min, more preferably at least 25 g/10 min. In an embodiment, MFI is at most 300 g/10 min, preferably at most 100 g/10 min, more preferably at most 60 g/10 min, most preferably at most 40 g/10 min.

Non-limiting examples of suitable polystyrenes which can be used in the composite material comprise polystyrene (for example, General Purpose Polystyrene—GPPS), modified polystyrene (for example, High Impact Polystyrene—HIPS), or combination of polystyrene and modified polystyrene. Combination of polystyrene and modified polystyrene is to be understood as any mixture of polystyrene and modified polystyrene. With preference, at least one of the first or second amorphous polymer is selected from polystyrene, modified polystyrene, or combination of polystyrene and modified polystyrene. In an embodiment, both the first and the second amorphous polymer are selected from polystyrene, modified polystyrene, or combination of polystyrene and modified polystyrene. Preferably, in such an embodiment, the first and second amorphous polymers differ by their respective molecular weight and/or by their respective melt flow index.

In the modified-polystyrene, part of the styrene may be replaced by unsaturated monomers copolymerizable with styrene, for example, alpha-methylstyrene or (meth)acrylates. Other examples which may be mentioned are chloropolystyrene, poly-alpha-methylstyrene, styrene-chlorostyrene copolymers, styrene-propylene copolymers, styrenebutadiene copolymers, styrene-isoprene copolymers, styrene-vinyl chloride copolymers, styrene-vinyl acetate copolymers, styrene-alkyl acrylate copolymers (methyl, ethyl, butyl, octyl, phenyl acrylate), styrene-alkyl methacrylate copolymers (methyl, ethyl, butyl, phenyl methacrylate), styrene methyl chloroacrylate copolymers and styrene-acrylonitrile-alkyl acrylate copolymers. The polystyrenes for use in the present invention may be co- or homopolymers of styrene, alpha methyl styrene and para methyl styrene. Preferably the polystyrene is homopolystyrene.

The polystyrenes may be prepared by a number of methods. This process is well known to those skilled in the art. An example, of method to produce polystyrene is given in EP2401311.

An example, of method to produce high impact polystyrene (HIPS) is given in US2012/0289656.

The modified-polystyrene for use in the composite material may be rubber modified.

The rubber may be prepared by a number of methods, preferably by emulsion or solution polymerization. These processes are well known to those skilled in the art. If present, preferably the rubber is present in an amount from about 3 to 15% by weight relative to the total weight of the modified-polystyrene. Polybutadiene is a particularly useful rubber.

Preferably the modified-polystyrene is rubber modified polystyrene.

In an embodiment, the rubber modified polystyrene is a High Impact Polystyrene (HIPS). The process for making HIPS is well known to those skilled in the art. For example, the process may comprise polymerizing styrene monomer in the presence of dissolved rubber. Polymerization of styrene, and optionally a comonomer, may be initiated by heating and/or by an initiator, by way of example, a radical initiator. The rubber may be "dissolved" in the styrene monomer. The usual rubber types utilized in the manufacture of HIPS include polybutadiene (PBu), styrene-butadiene rubber (SBR), and styrene-butadiene-styrene rubber (SBS). Polystyrene may be initially formed from the styrene monomer within the homogeneous rubber solution in styrene. In HIPS, a part of the styrene may be replaced by unsaturated monomers copolymerizable with styrene such as other monovinylaromatic monomers, alkyl esters of acrylic or methacrylic acid and acrylonitrile. Non-limiting examples of suitable processes for preparing HIPS are described in US2010/240832, incorporated herein by reference.

Advantageously, the modified-polystyrene is a HIPS or a mixture of polystyrene and HIPS. In an embodiment, the composite material comprises the melt blending product of said first and second amorphous polymer and said carbon particles.

In one or more embodiments the carbon particles are provided with a masterbatch. The inventive process for preparing a masterbatch comprises the steps of:
  a1. providing carbon particles;
  a2. providing an second amorphous polymer, said second amorphous polymer having a glass transition temperature Tg; and a melt flow index MFI of at least 10 g/10 min determined at 200° C. under a load of 5 kg according to IS01 133, and optionally from 0.01 to 4.0 by weight of one or more additives based on the total weight of the masterbatch, the one or more additives being selected from waxes, tristearin, zinc stearate, calcium stearate, magnesium stearate, erucyl amide, oleic acid amide, ethylene-acrilyc acid copolymer, ethylene vinyl acetate copolymer and cetyl trimethyl ammonium bromide;
  a3. blending together said carbon particles and said second amorphous polymer by extrusion in an extruder at a barrel temperature ranging from Tg to Tg+80° C. In an embodiment, the step a3) of blending together said carbon nanotubes and said second amorphous polymer by extrusion is conducted on co-rotating twin screw extruder at a screw speed of at least 250 RPM, with preference at least 300 RPM.

In an embodiment, the extrusion is performed in an extruder at a barrel temperature of at least Tg+5° C., more preferably of at least Tg+10° C. In another embodiment, the extrusion is performed in an extruder at a barrel temperature of at most Tg+60° C., more preferably of at most Tg+50° C.

In an embodiment, the first amorphous polymer having a melt flow index MFI1 and second amorphous polymer having a melt flow index MFI2, the process for preparing a composite material according to the invention further comprises the step of selecting the first and second amorphous polymer so that MFI 1 has a value of at most 0.5 the value of MFI2. With preference, MFI1 has a value of at most 0.3 time the value of MFI2. Preferably, the melt flow index MFI1 of the first amorphous polymer is at most 5 g/10 min, more preferably at most 4 g/10 min.

Preferably the first amorphous polymer is characterized by a high load melt flow index HLMI of more than 30 g/10 min according to ISO1 133 (21.6 kg–200° C.), preferably more than 40 g/10 min, preferably more than 50 g/10 min.

Polystyrene suitable for the disclosure as first polystyrene or second polystyrene are commercially available from Total®. For example, crystal polystyrene 1960N with an MFI of 30 g/10 min (5 kg–200° C.). For example, impact polystyrene 8260 with an MFI of 2.8 g/10 min (5 kg–200° C.).

The first amorphous polymer resin and/or the second amorphous polymer resin may comprise one or more amorphous polymer post-consumer resins; for example, the first amorphous polymer resin and/or the second amorphous polymer e resin comprises from 5 to 100 wt. % of amorphous polymer post-consumer resin based on the total weight of the amorphous polymer resin; for example, from 20 to 95 wt. %; for example, from 40 to 90 wt. %, for example, from 50 to 85 wt. %; for example, from 60 to 80 wt. %.

An example, of polystyrene comprising 20 wt. % of polymer post-consumer resins that is commercially available from Total® is XLR 5550.

When the first second amorphous resin and/or second amorphous resin is or comprises a post-consumer resin; the MFI of first amorphous resin and/or of second amorphous resin post-consumer resin can be selected in the same manner than for the virgin resin.

Test Methods

The melt index MI2 of the polypropylene is determined according to ISO 1133 at 230° C. under a load of 2.16 kg.

The melt flow index MI2 of the polyethylene is determined according to ISO 1133 at 190° C. under a load of 2.16 kg.

The melt flow index MFI of the amorphous polymer such as the polystyrene is determined according to ISO 1133 at 200° C. under a load of 5 kg.

The glass transition temperature Tg is determined according to ISO 11357-2:2013.

Molecular weights are determined by Size Exclusion Chromatography (SEC) at high temperature (145° C.). A 10 mg polypropylene sample is dissolved at 160° C. in 10 mL of trichlorobenzene (technical grade) for 1 hour. Analytical conditions for the GPC-IR from Polymer Char are:

Injection volume: +/−0.4 mL;
Automatic sample preparation and injector temperature: 160° C.;
Column temperature: 145° C.;
Detector temperature: 160° C.;
Column set: 2 Shodex AT-806MS and 1 Styragel HT6E;
Flow rate: 1 mL/min;
Detector: IRS Infrared detector (2800-3000 cm$^{-1}$);
Calibration: Narrow standards of polystyrene (commercially available);
Calculation for polypropylene: Based on Mark-Houwink relation ($\log_{10}(M_{PP})=\log_{10}(M_{PS})-0.25323$); cut off on the low molecular weight end at $M_{PP}=1000$;
Calculation for polyethylene: Based on Mark-Houwink relation ($\log_{10}(M_{PE})=0.965909 \log_{10}(M_{PS})-0.28264$); cut off on the low molecular weight end at $M_{PE}=1000$.

The molecular weight averages used in establishing molecular weight/property relationships are the number average ($M_n$), weight average ($M_w$) and z average ($M_z$) molecular weight. These averages are defined by the following expressions and are determined from the calculated $M_i$:

$$M_n = \frac{\sum_i N_i M_i}{\sum_i N_i} = \frac{\sum_i W_i}{\sum_i W_i/M_i} = \frac{\sum_i h_i}{\sum_i h_i/M_i}$$

$$M_w = \frac{\sum_i N_i M_i^2}{\sum_i N_i M_i} = \frac{\sum_i W_i M_i}{\sum_i M_i} = \frac{\sum_i h_i M_i}{\sum_i M_i}$$

$$M_z = \frac{\sum_i N_i M_i^3}{\sum_i N_i M_i^2} = \frac{\sum_i W_i M_i^2}{\sum_i W_i M_i} = \frac{\sum_i h_i M_i^2}{\sum_i h_i M_i}$$

Here $N_i$ and W are the number and weight, respectively, of molecules having molecular weight Mi. The third representation in each case (farthest right) defines how one obtains these averages from SEC chromatograms. $h_i$ is the height (from baseline) of the SEC curve at the $i_{th}$ elution fraction and $M_i$ is the molecular weight of species eluting at this increment.

The molecular weight distribution (MWD) is then calculated as Mw/Mn.

The $^{13}$C-NMR analysis is performed using a 400 MHz or 500 MHz Bruker NMR spectrometer under conditions such that the signal intensity in the spectrum is directly proportional to the total number of contributing carbon atoms in the sample. Such conditions are well known to the skilled person and include for example, sufficient relaxation time etc. In practice, the intensity of a signal is obtained from its integral, i.e., the corresponding area. The data is acquired using proton decoupling, 2000 to 4000 scans per spectrum with 10 mm room temperature through or 240 scans per spectrum with a 10 mm cryoprobe, a pulse repetition delay of 11 seconds and a spectral width of 25000 Hz (+/−3000 Hz). The sample is prepared by dissolving a sufficient amount of polymer in 1,2,4-trichlorobenzene (TCB, 99%, spectroscopic grade) at 130° C. and occasional agitation to homogenize the sample, followed by the addition of hexa-deuterobenzene ($C_6D_6$, spectroscopic grade) and a minor amount of hexamethyldisiloxane (HMDS, 99.5+%), with HMDS serving as internal standard. To give an example, about 200 mg to 600 mg of polymer is dissolved in 2.0 mL of TCB, followed by addition of 0.5 mL of $C_6D_6$ and 2 to 3 drops of HMDS.

Following data acquisition, the chemical shifts are referenced to the signal of the internal standard HMDS, which is assigned a value of 2.03 ppm.

The comonomer content in polypropylene or in polyethylene is determined by $^{13}$C-NMR analysis of pellets according to the method described by G. J. Ray et al. in Macromolecules, vol. 10, no 4, 1977, p. 773-778.

The isotacticity is determined by $^{13}$C-NMR analysis on the total polymer. In the spectral region of the methyl groups, the signals corresponding to the pentads mmmm, mmmr, mmrr and mrrm are assigned using published data, for example, A. Razavi, Macromol. Symp., vol. 89, pages 345-367. Only the pentads mmmm, mmmr, mmrr and mrrm are taken into consideration due to the weak intensity of the signals corresponding to the remaining pentads. For the signal relating to the mmrr pentad, a correction is performed for its overlap with a methyl signal related to 2,1-insertions. The percentage of mmmm pentads is then calculated according to $$\% \text{ mmmm} = \text{AREA}_{mmmm}/(\text{AREA}_{mmmm} + \text{AREA}_{mmmr} + \text{AREA}_{mmrr} + \text{AREA}_{mrrm}) \cdot 100$$

Melting temperatures Tm were determined according to ISO 3146 on a DSC Q2000 instrument by TA Instruments. To erase the thermal history the samples are first heated to 200° C. and kept at 200° C. for a period of 3 minutes. The reported melting temperatures Tm are then determined with heating and cooling rates of 20° C./min.

The density is determined according to ISO 1183 at a temperature of 23° C.

The content of carbon nanotubes in percentage by weight in blends (% CNT) can be determined by thermal gravimetric analysis (TGA) according to ISO 11358:2014, using a Mettler Toledo STAR TGA/DSC 1 apparatus. Prior to the determination of the content of carbon nanotubes in % by weight in blends (% CNT), the carbon content of the carbon nanotubes in % by weight (% C-CNT) was determined as follows: 2 to 3 milligrams of carbon nanotubes were placed into a TGA. The material was heated at a rate of 20° C./min from 30° C. to 600° C. in nitrogen (100 ml/min). At 600° C., the gas was switched to air (100 ml/min), and the carbon oxidized, yielding the carbon content of the carbon nanotubes in % by weight (% C-CNT). The % C-CNT value was the average of 3 measurements. For the content of carbon nanotubes % by weight in blends (% CNT), 10 to 20 milligrams of sample was placed into a TGA. The material was heated at a rate of 20° C./min from 30° C. to 600° C. in nitrogen (100 ml/min). At 600° C., the gas was switched to air (100 ml/min), and the carbon oxidized, yielding to the carbon content of carbon nanotubes in the sample (% C-sample). The % C-sample value was the average of 3 measurements. The content of carbon nanotubes in % by weight in the sample (% CNT) was then determined by dividing the carbon content of carbon nanotubes in % by weight in samples (% C-sample) by the carbon content of the carbon nanotubes in % by weight (% C-CNT) and multiplying by 100.

$$\% \text{ CNT} = \% \text{ C-sample}/\% \text{ C-CNT} * 100$$

Determination of the volatiles organic content by thermal desorption analysis (TDA) coupled with gas chromatography (GC)

The polymer sample (40 to 60 mg) is introduced in a ATD/GC equipment (Automatic Thermal Desorber) with FID (flame ionization detector) detection for the quantitative analysis.

In this analysis, a thermal desorption process is imposed to the polymer sample during 15 minutes at 150° C. in an oven. Volatile organic compounds are extracted from the sample by an imposed helium flux and are captured in an adsorbant cartridge TENAX cooled at −30° C.

In a second process, volatile compounds are injected in a chromatographic separation column via a rapid heating process of the cartridge at 230° C. The analytes are separated onto the column before being detected by FID.

Results: The compounds are identified based on their retention times in comparison with previously determined retention times of n-paraffins, in the same experimental conditions. The quantification of the components is performed using an external calibration curve (linear) established using 1-hexene as reference.

Chromatographic analysis conditions:
Capillary column: type: HP-5
  Length: 60 m
  Internal diameter: 0.32 mm
  Phase type: 5% Ph-Me-siloxane
  Phase thickness: 1 μm
Detector type: F.I.D
  Temperature: 280° C.
  Air flow: 450 ml/min
  Hydrogen flow: 40 ml/min
  Flow make up: 30 ml/min (constant)
GC oven programmation: Isothermal temperature 1: 45° C.
  Isotherm time 1: 15 minutes
  Heating rate: 5° C./min
  Isothermal temperature 2: 280° C.
  Isothermal time 2: 25 min. or 5 min. for the calibration line
ATD conditions
Thermo desorption equipment: TurboMatrix ATD from Perkin Elmer
  Oven temperature: 150° C.
  Desorption time: 15 minutes.
  Trap temperature: Low temperature: −30° C. (trapping mode)
  High temperature: 230° C. (desorption mode)
  Desorption time of the trap: 10 minutes
  Trap heating rate: 99° C./s
  Temperature of the transfer line: 250° C.
  Valve block temperature: 200° C.
  Carrier gas pressure: 12.5 psi
  Inlet split flow: 37 ml/min
  Outlet split flow: 16.5 ml/min
  Desorption flow: 20 ml/min
  Considered mode: MS
  Purge time: 1 minute
  Run time: 79 minutes (32 minutes for the calibration line)

EXAMPLES

The following non-limiting examples illustrate the disclosure.

Example 1: Production of PP-CNT Products

A CNT-PP compound containing 10 wt % CNT was produced using polypropylene and multi-walled carbon nanotubes. The CNT used were Nanocyl™ NC 7000, commercially available from Nanocyl. These CNTs have an average aspect ratio L/D ranging from 150-160. The polypropylene was Lumicene® MH140CN0, commercially available from Total and characterized by a melt flow index (2.16 kg/230 C) of 140 g10 min.

The CNT-PP containing 10 wt. % CNT was prepared by blending the Lumicene® MH140CN0 grade and carbon nanotubes using a classical twin-screw extrusion process. Carbon nanotubes powder and polyethylene were introduced into the extruder such as to obtain about 10% by weight based on the total weight of the compound. The PP-CNT compound was blended on a Leistritz co-rotating twin-screw extruder with a "length over diameter" L/D ratio of 52 (D=60 mm).

Extrusion conditions and analysis performed on the compounds are detailed in table 1 below:

TABLE 1

| Temperature | Zone 1 | 150° C. |
|---|---|---|
| | Zone 2 | 158° C. |
| | Zone 3 | 151° C. |
| | Zone 4 | 140° C. |
| | Zone 5 | 133° C. |
| | Zone 6 | 126° C. |
| | Zone 7 | 116° C. |
| | Zone 8 | 111° C. |
| | Zone 9 | 104° C. |
| | Zone 10 (die) | 101° C. |
| Extruder load | | 20% |
| Measured pressure at the die | | 41 bar |
| Compound (measured) melt temperature at the exit | | 142° C. |
| Screw speed | | 500 rpm |
| Imposed throughput | | 150 kg/h |
| Compound analysis | | |
| Melt index (230 C. - 21.6 kg) | | 110 g/10 min. |
| Melt index (230 C. - 5 kg) | | <0.1 g/10 min. |
| Flexural modulus (ISO 178 - method A) | | (1535 ± 18) MPa |
| IZOD resilience (ISO180 - 23 C.) | | (1.77 ± 0.13) kJ/m² |

This compound has been used "as it" and "diluted". For the compounds containing a CNT content lower than 10% in weight, a blend with the PPC6742 grade, commercially available grade from Total and characterized by a melt flow index (2.16 kg/230 C) of 8 g10 min., has been previously performed. These compounds with a CNT content lower than 10% in weight were performed in a Leistritz ZSE-HPE18 co-rotating twin screw extruder with a "length over diameter" L/D ratio of 40 (D=18 mm). Extrusion conditions are detailed in the table 2 below.

TABLE 2

| Temperature | Zone 1 | 230° C. |
|---|---|---|
| | Zone 2 | 240° C. |
| | Zone 3 | 250° C. |
| | Zone 4 | 250° C. |
| | Zone 5 | 250° C. |
| | Zone 6 | 250° C. |
| | Zone 7 | 250° C. |
| | Zone 8 (die) | 250° C. |
| Torque | | 21% |
| Measured pressure at the die | | 8 bar |
| (Measured) melt temperature at the exit | | 265° C. |
| Screw speed | | 200 rpm |
| Throughput | | 3 kg/h |

Example 2: Injection of the PP-CNT Compounds

Above produced PP-CNT compounds were injected in a DrBoy 22A single screw injection machine equipped with a 18 mm diameter single screw. The mould dimensions are 60 mm*60 mm*1 mm. These "1 mm thickness squares" are produced in the following conditions.

TABLE 3

| Barrel temperature | 255° C. |
|---|---|
| Mold temperature | 40° C. |
| Material front speed | 200 mm/s |
| Injection time (it has been adjusted to fulfil the targeted material front speed) | 0.64 s |
| Hold time | 40 s |

Example 3: Production of PP-CNT Sheets

The PP-CNT compounds were extruded to form a sheet having a thickness of about 300 μm on a Collin sheet extruder type 20x 25D, having a fishtail die of 150 mm.

The conditions of process are given in the table 4 below:

TABLE 4

| Temperature | Zone 1 | 30° C. |
|---|---|---|
| | Zone 2 | 220° C. |
| | Zone 3 | 245° C. |
| | Zone 4 | 250° C. |
| | Zone 5 (die - left part) | 225° C. |
| | Zone 6 (die - central part) | 250° C. |
| | Zone 7 (die (right part) | 230° C. |
| Measured pressure at the die | | 35 bar |
| (Measured) melt temperature at the exit | | 235° C. |
| Screw speed | | 50 rpm |
| Througput | | 2 kg/h |
| No imposed calendaring step | | |

Example 4: Preparation of Compressed Samples

The central cavity (148*148 mm²) of a mold (thickness=5 mm) was filled with a slight excess of PP-CNT compounds (practically we put 115 g). This mold (with the polymer in its central cavity) was put between two large plates covered by a polyimide film in the part in contact with the polymer (the polyimide film will be helpful when the compressed polymer plate will be removed at step D of the procedure). The whole system is then introduced in a compression equipment (mark: Scamex). Compression was performed using the following procedure:

A. The plates in the compression machine are heated up to 240 C. During this time a gentle compression is applied to the polymer (during this step, the excess polymer, if any could exit from the mold).
B. When the targeted temperature is reached, a 250 kN force is applied during 10 minutes
C. Then cooling is imposed, keeping the applied force.
D. After roughly 25 minutes, a temperature of 40 C is reached. The (compressed) plate is then recovered To characterize the electrical properties of the compressed samples, small devices are cut from the compressed plates (practically, we used samples with 34.5 mm wide). If needed, to obtain very flat surfaces, the sample could be machined.

Electrical contacts must be established as described below (see the electrical properties characterizations). FIG. 1 presents a compressed sample (width=34.5 mm, thickness— after the sample has been machined=4 mm–length=140 mm). The distance between the electrodes, in this case, is 70.5 mm.

Example 5: Electrical Properties Characterizations

To properly evaluate the electrical resistivity of the PP-CNT devices, establishment of good contacts with the measurement devices is a key-point. To do so:
- The PP-CNT compound locations which will be in contact with the electrical properties measurement tool via cupper blocks are corona treated. To do so, a corona laboratory equipment (model "école" produced by Boussey-control) is used;
- A silver ink (Alfa Aesar—Silver conductive ink—Liquid S-020) is put on the treated PP-CNT parts of the devices;
- Cupper blocks (two blocks per electrode) are used to sandwich the sample (see the figure below).

It is to be noted that the precise value of the surface tension after treatment is not so important: values ranging between 34 and 42 mN/m are suitable. The key-point is a good adhesion of the silver ink, after deposit, on the PP-CNT devices.

However, it is important that the contacts between the cupper and the PP-CNT devices are established through, precisely, the silver electrodes.

The cupper blocks must be parallel to each other, imposing a constant distance between the electrodes. For the devices considered in these examples, such distance between the electrodes is 40 mm both for the injected "1 mm thickness squares" and for the samples extracted from the sheets.

The cupper blocks are connected to a tension generator ("DC power Supply AL924A" produced by ELC). A measurement of the current is indicated in front of this equipment.

Two types of experiments are performed on the PP-CNT devices. Measurement were performed in a big laboratory, regulated at 23 C (50% humidity), on a table without any perturbating devices all around:
a) To characterize the electrical resistivity, a tension U, ranging between 0 and 30 V (step 6 V) is imposed. Just after imposition of the tension (to avoid significant heating) the induced current l is measured. The electrical resistance is determined from the slope of the U=f(I) recorded dependence. If such law would not cross the origin, i.e., the (0,0) point, this means that a contact resistance exists. If so, the electrical contacts must be checked, repaired and the measurements must be restarted.

The electrical resistivity is determined from the R=ρ*l/s dependence, "l" being the distance between the electrodes (40 mm in the considered examples) and S the section of the sample (60*1 mm$^2$ for the "1 mm thickness squares" and 60*~0.3 mm$^2$ for the extruded sheet).

There was not any significant anisotropy identified when characterizing the device electrical resistivity. In other words, the electrical resistivity values determined in the machine direction" or in the "transverse direction" are roughly the same ("machine direction" and "transverse direction" are relative to the direction of the flux in the mould, when injection is considered, or out of the die, in the sheet extrusion process.
b) In other experiments, a constant tension is applied and the temperature evolution with time is recorded using a thermal camera (model E50 produced by FLIR). When quantification are provided, the temperature at the center of the sample is considered.

In many cases, after some times, the temperature will stabilized itself at a constant value. In some cases, we validated that such temperature remains constant during at least 2 hours; if so, such temperature is called the "stationary temperature" ($T_{stationary}$) However, in case the sheet is close to one or more rigid elements (such as a metallic panel) able to reflect infrared waves, the stationary temperature will be switched to a higher temperature compared to the temperature obtained in the above experiment conditions. Electrical resistivities values are reported in the table 5.

TABLE 5

| | Electrical Resistivity (W * m) | |
|---|---|---|
| CNT content in the plate | TD (Transverse Direction) | MD (Machine Direction) |
| Injected "1 mm thickness squares" | | |
| 4 wt % | 9.1 | 15 |
| 6 wt % | 0.63 | 0.56 |
| 8 wt % | 0.063 | 0.062 |
| 10 wt % | 0.0086 | 0.0082 |
| Sheets | | |
| 4 wt % (thickness of the sheet: 300 μm) | 2.3 | 3.7 |
| 6 wt % (thickness of the sheet: 310 μm) | 0.16 | 0.17 |
| 8 wt % (thickness of the sheet: 320 μm) | 0.039 | 0.042 |
| Compressed plates (no MD-TD considerations) | | |
| 4 wt % CNT | 0.29 | |
| 6 wt % CNT | 0.061 | |
| 10 wt % CNT | 0.010 | |

Figure 2:
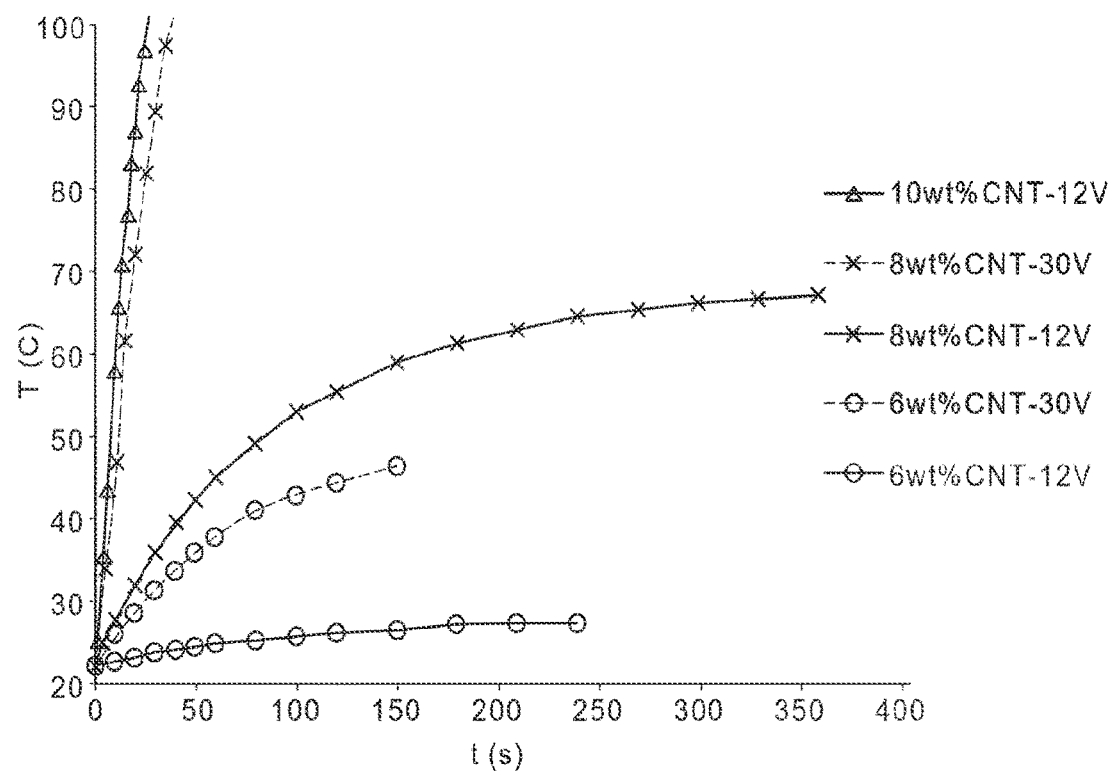
FIG. 2 is a graph showing the evolution of the temperature with time for injected devices in the machine direction and in FIG. 3 for injected devices in the transverse direction
Figure 3:
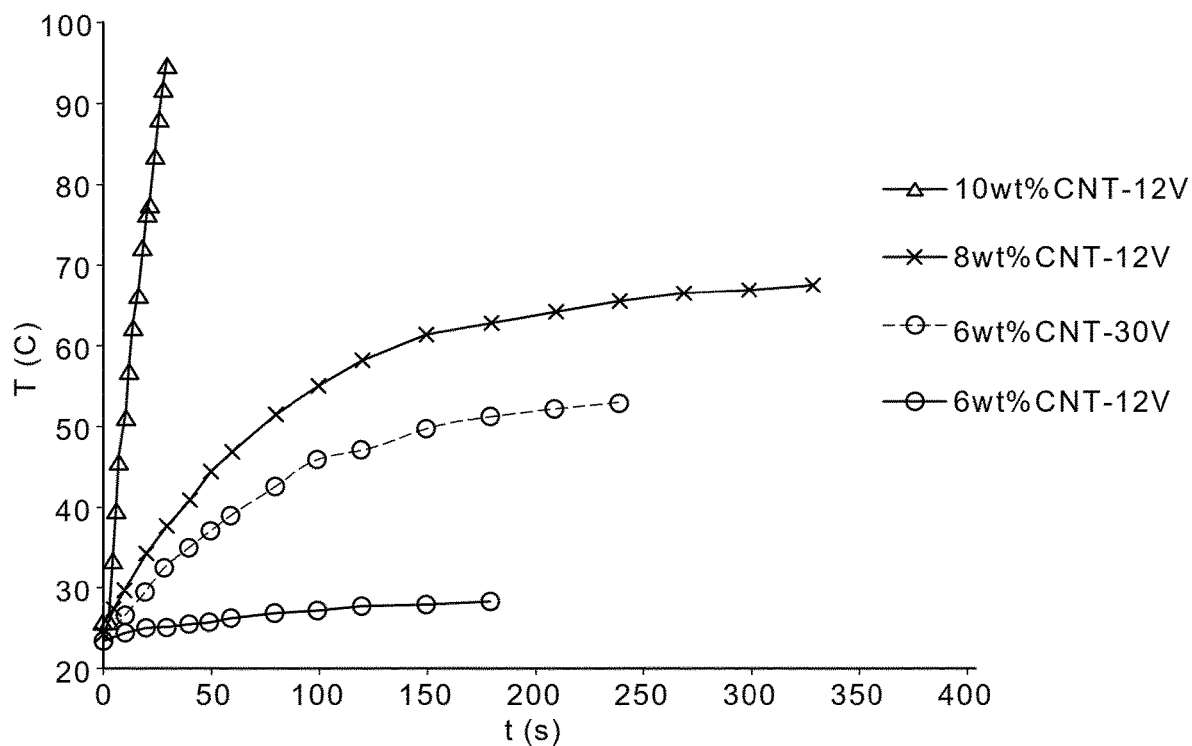
FIG. 3 is a graph showing the evolution of the temperature with time for injected devices in the transverse direction

Evolution of the temperature with time is presented in the FIG. 2 for injected devices in the machine direction, and in FIG. 3 for injected devices in the transverse direction. From the results it can be seen that highest speed in increase of temperature can be achieved with a CNT content of 8 wt. % or more and a voltage of 12 V only. Of course, when the temperature increases very fast, the applied tension has been switched off at about 100° C. In such cases, no stationary temperature was determined.

Figure 4:
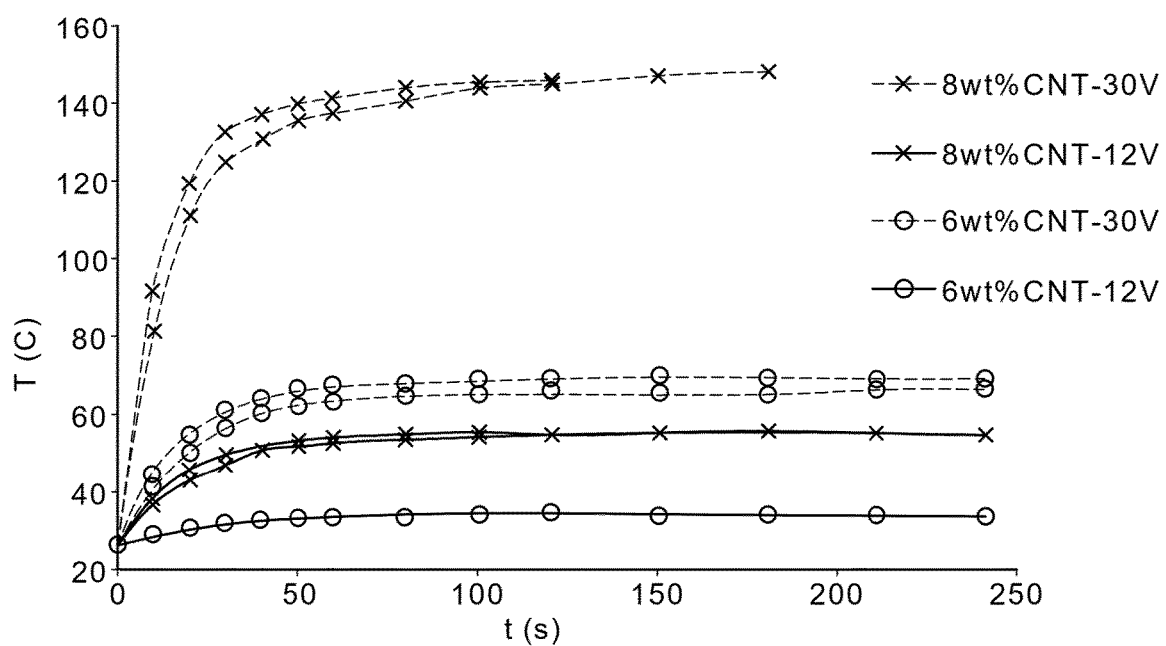
FIG. 4 is a graph showing the evolution of the temperature with time for extruded sheet
Figure 5:
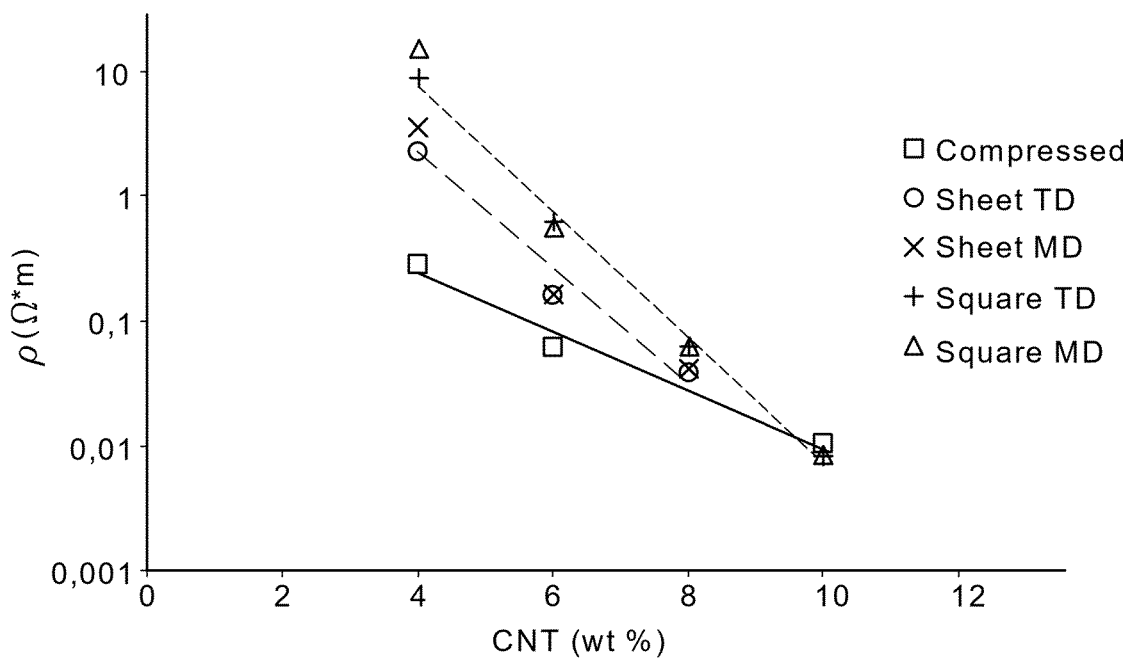
FIG. 5 is a graph showing the evolution of the resistivity at different CNT concentrations on sheet obtained by different processes.

FIG. 4 shows the results for sheets extrusion (without calendering). It can be seen that an increase in the content of CNT within the composite material leads to an increase of the temperature achieved. It can also be seen that an increase in the voltage applied is to an increase in the temperature achieved. The targeted temperature to be attained being at least 40° C., it can be seen that the composite material according to the disclosure allows achieving such targeted temperature with a CNT content as low as 6 wt. % provided that a voltage of 30 V is applied; or with the application of a voltage of 12 V only, provided the CNT content is at least 8 wt. %. It is understood that these results are linked to the geometry (surface and thickness) of the sheet. A change of geometry would result in a variation of the said results.

FIG. 4 also shows the stationary temperature observed with the sheets at different voltage and carbon particles content. From the results, it can be seen that for a voltage of 30 V a stationary temperature of at most 148° C. was obtained with a CNT content of 8 wt. % and of at most 56° C. with a CNT content of 6 wt. %. For a voltage of 12 V a stationary temperature of at most 69° C. was obtained with a CNT content of 8 wt. % and of at most 34° C. with a CNT content of 6 wt. %.

The invention claimed is:

1. Electrical heating panel, wherein the electrical heating panel comprises at least one device selected from a plate, a sheet or a film, wherein said device has one or more layers wherein at least one layer is a heating layer, characterized in that the one or more heating layers are made of a composite material comprising:

from 5 to 95 wt. % based on the total weight of the composite material of a first polymer is or comprises a first polypropylene resin wherein resin wherein the first polypropylene resin is selected from a propylene homopolymer, a copolymer of propylene with one or more comonomers selected from ethylene and C4-C20 alpha-olefins, an heterophasic polypropylene and any mixture thereof;

from 5.0 to 16.0 wt. % of carbon particles based on the total weight of the composite material as determined according to ISO 11358:2014; wherein the carbon particles are selected from carbon nanotubes, carbon fibers, carbon black and any combination thereof; wherein at least 85 wt. % of the carbon particles based on the total weight of the carbon particles have an average aspect ratio L/D that is ranging from 120 to 800;

wherein each of the one or more heating layers has a thickness ranging from 100 µm to 4.0 mm.

2. The electrical heating panel according to claim 1, characterized in that the device comprises only one heating layer.

3. The electrical heating panel according to claim 2, characterized in that the device is monolayered and comprises only the heating layer.

4. The electrical heating panel according to claim 1, characterized in that the device is multi-layered and comprises one or more heating layers and one or more insulating layers wherein the insulating layer is made of a third polymer that is the same as the first polymer or that is different from the first polymer provided it is of the same nature.

5. The electrical heating panel according to any claim 1, characterised in that the device is multi-layered and comprises one or more heating layers and one or more insulating layers, wherein the insulating layer is devoid of conductive particles.

6. The electrical heating panel according to claim 1, characterized in that the electrical heating panel comprises two electrodes in contact with the electrical heating layer, and in that the content of carbon particles in the composite material is selected to comply with the formula:

$$wt.\% \text{ carbon particles} \geq -\frac{1}{a} * \ln\left[\frac{U^2 * h}{b * HP_{min} * l^2}\right]$$

wherein:

U is the voltage intended to be applied to the electrical heating panel; preferably U is ranging from 12 to 48 V;

$HP_{min}$ is the minimal heating power desired; preferably $HP_{min}$ is ranging from 200 W/m² to 4000 W/m²;

h is the thickness of the heating layer and is ranging from 100 µm to 4.0 mm; preferably h is ranging from 100 µm to 1.0 mm or from 0.5 mm to 2.5 mm;

l is the distance between the two electrodes; preferably l is ranging from 5 to 50 cm;

a is at least 0.5, b is at least 2;

and wherein at least 85 wt. % of the carbon particles based on the total weight of the carbon particles have an average aspect ratio L/D ranging from 140 to 290.

7. The electrical heating panel according to claim 1, characterized in that the first polymer:

is selected from a virgin polymer resin, a post-consumer polymer resin and a blend of a virgin polymer resin and a post-consumer polymer resin; and/or comprises from 5 to 100 wt. % of post-consumer polymer resin based on the total weight of the first polymer.

8. The electrical heating panel according to claim 1, characterized in that the carbon particles are directly blended with the first polymer; or in that the carbon particles are provided in a form of a masterbatch comprising the blend of carbon particles in a content ranging from 4.0 wt. % to 30.0 wt. % as determined according to ISO 11358:2014 and based on the total weight of said masterbatch; and a second polymer which is one or more semi-crystalline polymers selected from polypropylene; provided that the second polymer is of the same nature as the first polymer.

9. The electrical heating panel according to claim 1, characterized in that the composite material is produced by the direct blend of the carbon particles with the first polymer, and in that the first polypropylene resin has a melt index MI2 ranging from 80 to 260 g/10 min.

10. The electrical heating panel according to claim 1, characterized in that the carbon particles are provided in a form of a masterbatch comprising the blend of carbon particles and a second polymer; wherein the second polymer is or comprises a second polypropylene resin.

11. Electrical heating panel, wherein the electrical heating panel comprises at least one device selected from a plate, a sheet or a film, wherein said device has one or more layers wherein at least one layer is a heating layer, characterized in that the one or more heating layers are made of a composite material comprising:

from 5 to 95 wt. % based on the total weight of the composite material of a first polymer wherein the first polymer is or comprises a first polyethylene resin;

from 5.0 to 16.0 wt. % of carbon particles based on the total weight of the composite material as determined according to ISO 11358:2014; wherein the carbon particles are selected from carbon nanotubes, carbon fibers, carbon black and any combination thereof; wherein at least 85 wt. % of the carbon particles based on the total weight of the carbon particles have an average aspect ratio L/D that is ranging from 120 to 800;

wherein each of the one or more heating layers has a thickness ranging from 100 µm to 4.0 mm.

12. The electrical heating panel according to claim 11, characterized in that the first polyethylene resin has a melt index MI2 ranging from 0.1 to 100 g/10 min.

13. The electrical heating panel according to claim 11, characterized in that the first polyethylene resin has a density ranging from 0.900 g/cm³ to 0.960 g/cm³.

14. The electrical heating panel according to claim 11, characterized in that the first polyethylene resin is or comprises a post-consumer resin being a blend of recycled polypropylene and recycled polyethylene, wherein the content of the recycled polypropylene ranges from 3 to 25 wt. % relative to the total weight of the post-consumer resin.

15. The electrical heating panel according to claim 11, characterized in that the composite material is produced by the direct blend of the carbon particles with the first polymer, and in that the first polyethylene resin is preferably selected to have a melt index MI2 ranging from 4 to 100 g/10 min.

16. The electrical heating panel according to claim 11, characterized in that the carbon particles are provided in a form of a masterbatch comprising the blend of carbon particles and a second polymer; wherein the second polymer is or comprises a second polyethylene resin.

17. The electrical heating panel according to claim 16, characterized in that the second polyethylene resin has an MI2 ranging from 4 to 100 g/10 min.

18. The electrical heating panel according to claim 16, characterized in that the second polyethylene resin is or comprises a post-consumer resin; and further wherein the post-consumer resin being a blend of recycled polypropylene and recycled polyethylene, wherein the content of the recycled polypropylene is ranging from 3 to 25 wt. % relative to the total weight of the post-consumer resin.

19. Electrical heating panel, wherein the electrical heating panel comprises at least one device selected from a plate, a sheet or a film, wherein said device has one or more layers wherein at least one layer is a heating layer, characterized in that the one or more heating layers are made of a composite material comprising:
 a first polymer which is of one or more amorphous polymers;
 from 5.0 to 16.0 wt. % of carbon particles based on the total weight of the composite material; wherein the carbon particles are selected from carbon nanotubes, carbon fibers, carbon black and any combination thereof; wherein at least 85 wt. % of the carbon particles based on the total weight of the carbon particles have an average aspect ratio L/D that is ranging from 120 to 800;
 wherein each of the one or more heating layers has a thickness ranging from 100 μm to 4.0 mm; and, characterized in that the first amorphous polymer is selected from polystyrene, acrylonitrile-butadiene-styrene, polycarbonate, styrene acrylonitrile, poly(methyl methacrylate), poly(vinyl chloride), polybutadiene, polybutylene terephthalate, poly(p-phenylene oxide), polysulfone, polyethersulfone, polyethylenimine, polyphenylsulfone, acrylonitrile styrene acrylate or any combination thereof, and wherein the first polymer has a high load melt flow index HLMI of more than 30 g/10 min and wherein the composite material is produced by the direct blend of the carbon particles with the first polymer, and wherein the first amorphous resin is preferably selected to have an MFI at least 10 g/10 min as measured at 200° C. under a load of 5 kg.

20. The electrical heating panel according to claim 19, characterized in that the first polymer is polystyrene and selected from polystyrene, modified polystyrene, or combination of polystyrene and modified polystyrene.

21. The electrical heating panel according to claim 19, characterized in that the carbon particles are provided in a form of a masterbatch comprising the blend of carbon particles and a second polymer; wherein the second polymer is or comprises a second amorphous polymer resin similar or different from the first amorphous polymer resin.

22. The electrical heating panel according to claim 11, characterized in that the device comprises only one heating layer.

23. The electrical heating panel according to claim 22, characterized in that the device is monolayered and comprises only the heating layer.

24. The electrical heating panel according to claim 11, characterized in that the device is multi-layered and comprises one or more heating layers and one or more insulating layers wherein the insulating layer is made of a third polymer that is the same as the first polymer or that is different from the first polymer provided it is of the same nature.

25. The electrical heating panel according to any claim 11, characterised in that the device is multi-layered and comprises one or more heating layers and one or more insulating layers, wherein the insulating layer is devoid of conductive particles.

26. The electrical heating panel according to claim 11, characterized in that the electrical heating panel comprises two electrodes in contact with the electrical heating layer, and in that the content of carbon particles in the composite material is selected to comply with the formula:

$$\text{wt. \% carbon particles} \geq -\frac{1}{a} * \ln\left[\frac{U^2 * h}{b * HP_{min} * l^2}\right]$$

wherein:
 U is the voltage intended to be applied to the electrical heating panel; preferably U is ranging from 12 to 48 V;
 $HP_{min}$ is the minimal heating power desired; preferably $HP_{min}$ is ranging from 200 W/m$^2$ to 4000 W/m$^2$;
 h is the thickness of the heating layer and is ranging from 100 μm to 4.0 mm; preferably h is ranging from 100 μm to 1.0 mm or from 0.5 mm to 2.5 mm;
 l is the distance between the two electrodes; preferably l is ranging from 5 to 50 cm;
 a is at least 0.5,
 b is at least 2;
 and wherein at least 85 wt. % of the carbon particles based on the total weight of the carbon particles have an average aspect ratio L/D ranging from 140 to 290.

27. The electrical heating panel according to claim 11, characterized in that the first polymer:
 is selected from a virgin polymer resin, a post-consumer polymer resin and a blend of a virgin polymer resin and a post-consumer polymer resin; and/or
 comprises from 5 to 100 wt. % of post-consumer polymer resin based on the total weight of the first polymer.

28. The electrical heating panel according to claim 27, characterized in that the carbon particles are directly blended with the first polymer; or in that the carbon particles are provided in a form of a masterbatch comprising the blend of carbon particles in a content ranging from 4.0 wt. % to 30.0 wt. % as determined according to ISO 11358:2014 and based on the total weight of said masterbatch; and a second polymer which is one or more semi-crystalline polymers selected from polyethylene provided that the second polymer is of the same nature than the first polymer.

* * * * *

UNITED STATES PATENT AND TRADEMARK OFFICE
CERTIFICATE OF CORRECTION

| | |
|---|---|
| PATENT NO. | : 11,856,662 B2 |
| APPLICATION NO. | : 17/908867 |
| DATED | : December 26, 2023 |
| INVENTOR(S) | : Lhost et al. |

It is certified that error appears in the above-identified patent and that said Letters Patent is hereby corrected as shown below:

In the Claims

Claim 6, Column 52, Lines 1-2:
"1 is the distance between the two electrodes; preferably
1 is ranging from 5 to 50 cm;"
Should read:
"l is the distance between the two electrodes; preferably
l is ranging from 5 to 50 cm;"

Claim 26, Column 54, Lines 39-40:
"1 is the distance between the two electrodes; preferably
1 is ranging from 5 to 50 cm;"
Should read:
"l is the distance between the two electrodes; preferably
l is ranging from 5 to 50 cm;"

Signed and Sealed this
Twentieth Day of February, 2024

*Katherine Kelly Vidal*

Katherine Kelly Vidal
*Director of the United States Patent and Trademark Office*